United States Patent [19]
Guy

[11] Patent Number: 5,778,424
[45] Date of Patent: Jul. 7, 1998

[54] DISTRIBUTED PLACEMENT, VARIABLE-SIZE CACHE ARCHITECTURE

[75] Inventor: Charles B. Guy, Hillsboro, Oreg.

[73] Assignee: AVSYS Corporation, Hillsboro, Oreg.

[21] Appl. No.: 56,366

[22] Filed: Apr. 30, 1993

[51] Int. Cl.$^6$ .................................... G06F 12/00
[52] U.S. Cl. .............. 711/118; 364/DIG. 1; 364/DIG. 2; 364/243.4; 364/243.41; 711/117; 711/128; 711/154
[58] Field of Search ..................... 395/446, 447, 395/444, 445; 364/DIG. 1, DIG. 2, 243.4, 243.45, 243.42; 711/117, 118, 119, 128, 154

[56] References Cited

U.S. PATENT DOCUMENTS

| | | | |
|---|---|---|---|
| 5,008,813 | 4/1991 | Crane et al. | 395/425 |
| 5,014,195 | 5/1991 | Farrell et al. | 395/445 |
| 5,019,971 | 5/1991 | Lefsky et al. | 395/250 |
| 5,056,002 | 10/1991 | Watanabe | 395/446 |
| 5,117,350 | 5/1992 | Parrish et al. | 395/401 |
| 5,133,061 | 7/1992 | Melton et al. | 395/455 |
| 5,168,560 | 12/1992 | Robinson et al. | 395/425 |
| 5,210,843 | 5/1993 | Ayer | 395/455 |
| 5,226,141 | 7/1993 | Esbensen | 395/497.02 |
| 5,276,832 | 1/1994 | Holman, Jr. | 395/425 |
| 5,345,584 | 9/1994 | Hill | 395/600 |
| 5,353,425 | 10/1994 | Malany et al. | 395/471 |
| 5,367,653 | 11/1994 | Coyle et al. | 395/400 |
| 5,410,653 | 4/1995 | Macon, Jr. et al. | 395/250 |
| 5,414,828 | 5/1995 | Yarkoni et al. | 395/445 |
| 5,432,918 | 7/1995 | Stamm | 395/483 |
| 5,479,655 | 12/1995 | Iwamoto et al. | 395/600 |
| 5,522,067 | 5/1996 | Swire | 395/600 |
| 5,535,416 | 7/1996 | Feeney et al. | 395/834 |
| 5,537,568 | 7/1996 | Yanai et al. | 395/445 |
| 5,586,303 | 12/1996 | Willenz et al. | 395/497.03 |

OTHER PUBLICATIONS

Smith, Alan Jay; *Cache Memories*, UC Berkeley; Computing Surveys, vol. 14, No. 3, Sep. 1982, pp. 474–530.

*Primary Examiner*—Tod R. Swann
*Assistant Examiner*—Tuan V. Thai
*Attorney, Agent, or Firm*—Robert D. Varitz

[57] ABSTRACT

A distributed variable-size cache placement architecture includes plural cache storage units (CSUs), each of which includes a CSU control logic, an address director, a data director, a placement array, placement logic (i.e., distribution controller), and a set associative memory for caching data. All CSUs in the architecture are connected over a communication network to a single processor interface and mainstore and which provides information to all CSUs about the status of each of the other CSUs. Any number of CSUs may be connected in parallel to provide a variable size cache. All CSUs sharing a processor interface utilize the same placement block size, contain the same number of sets of cache elements and use the same CSU placement mechanism.

17 Claims, 13 Drawing Sheets

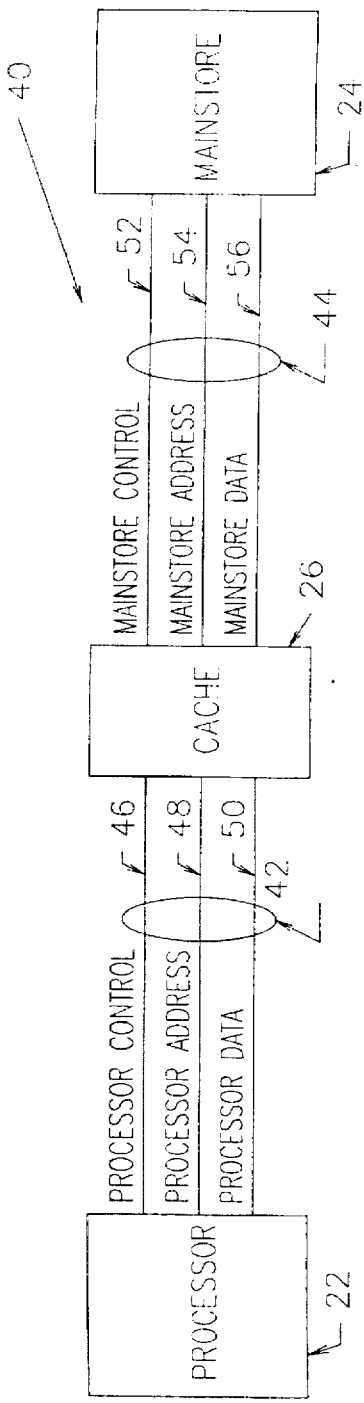
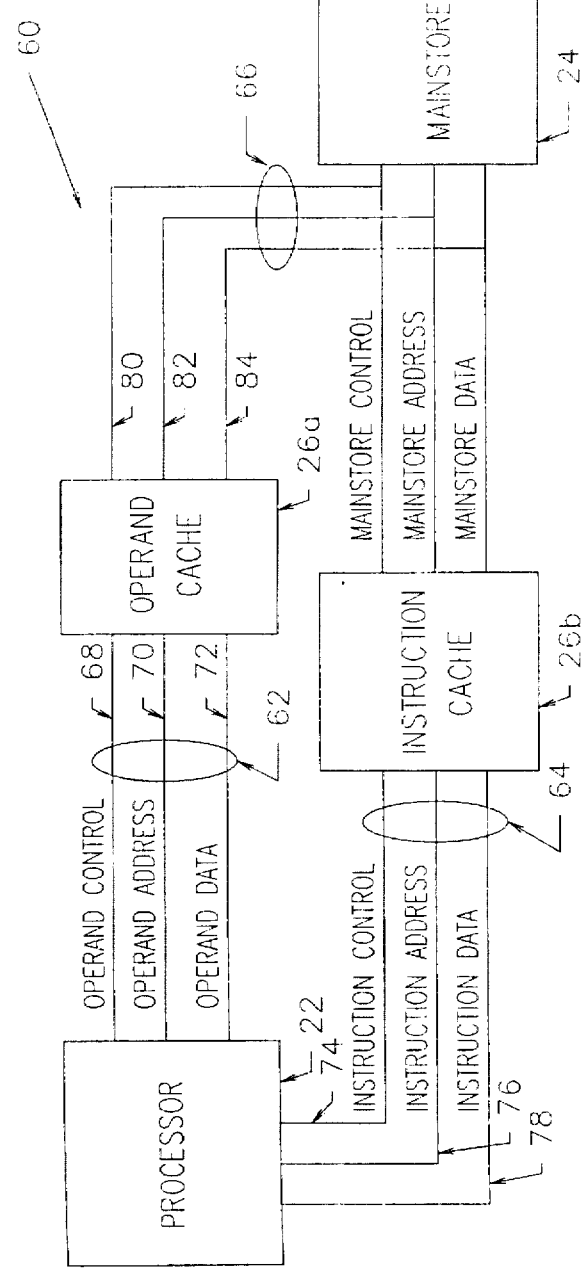

DISTRIBUTED PLACEMENT, VARIABLE-SIZE CACHE ARCHITECTURE

BACKGROUND OF THE INVENTION

This invention relates to caches for use in computer systems and specifically to a distributed cache placement architecture which provides multiple cache storage units (CSUs) and a placement mechanism for caching data in any of a number of provided set associative memory locations.

Caching, as used herein, refers to a fast local storage which provides a temporary storage of a subset of a larger mainstorage, or backing storage.

Data is transferred between the cache and mainstorage in blocks, referred to as either cache blocks or as cache lines. Each cache line or block in the mainstore is "mapped" by the hardware into a set, consisting of one or more elements, in the cache storage. A particular mainstorage cache line address is only present in the cache in one of these elements at any given time, i.e., no duplicate cache line addresses are present in the cache.

A commonly used mapping algorithm is a SET ASSOCIATIVE mapping, which is the algorithm used for purposes of illustration herein. The mapping algorithm is implemented in hardware, and its operation is transparent to the software.

The cache temporarily stores the data of the mainstorage element and tracks the data mainstore address. The cache handles all references to a mainstore address while the associated data is present in the cache.

A data reference, or search, which finds the information present in the cache is referred to as a cache HIT. When a data reference fails to find the data present in the cache the access is a cache MISS.

When a cache MISS occurs, the desired cache line from mainstorage is placed into the cache so that future references to the mainstorage element will result in a cache HIT. A cache MISS displaces any stale data present in the cache. The cache element used to store the data from mainstore is determined by the placement algorithm.

Known caching systems use a central placement algorithm. This arrangement is used in discrete cache implementations as well as in implementations which are integrated with processors. Some examples of known prior art cache implementations include cache tag devices, cache data devices and integrated cache devices.

The placement algorithm consists of a stored state for each set of elements in the cache and control logic for changing the state of this stored information. Prior art uses a central storage mechanism to track the placement element for each set in the SET ASSOCIATIVE cache memory, giving a fixed and limited number of elements for each set.

An example of an integrated cache device is found on the NEC uPD43608 8K byte cache device. This device supports programmable selection of interface signals, data width and up to three additional cache devices in the system. The internal organization includes 128 sets having four elements per set and a 16 byte cache block size. Another form of the integrated cache device is used in the Intel 82395 cache device, which is intended for use with the Intel 80386 integrated circuit. The Intel 82395 device has a special configuration option which allows the user to select a total of one, two or four devices in a system. The number of sets is increased by a factor equal to the number of devices present in the system, however, no more than four devices may be used in any one system. All system configurations have a four-way set associative memory.

Another form of the integrated cache is found in a chip set which utilizes the Intel 82495 cache controller and multiple 82490 cache data devices. The 82495 and 82490 combination offers a number of different configurations, however, they are all intended to work with the Intel 80486 processor and include an interface which is optimized for that processor. Use of the 82495 and 82490 caches are as secondary caches, as the 80486 circuit has an internal cache integrally formed therein. When arrayed with the 80486 processor, the 82495 and 82490 results in a two-way set associative memory.

While the aforementioned architectures are useful for their intended purpose, they do not have sufficient flexibility to allow distribution of data among a number of cache locations. Also increasing the size of the aforementioned architectures will have a major impact on the design of the circuit board.

The subject of this patent is a new mechanism for implementing the placement algorithm of mainstorage elements into a cache storage. This implementation allows the placement algorithm to be distributed across any number of devices. Additionally, only a subset of the total elements in each set need be present in the system for correct system operation.

An object of the invention is to provide a distributed cache placement architecture which allows the caching of information in a variety of locations.

Another object of the invention is to provide a single device type which may be operated in parallel to provide a cache storage sub-system.

A further object of the invention is to provide a cache placement architecture which supports a variable cache size.

Another object of the invention is to provide a single cache device type which may be configured in different caching densities and which may still be incorporated into a single system.

Yet another object of the invention is to provide a cache architecture which may be hardware-updated as new storage devices become available.

Another object of the invention is to provide a cache architecture which includes a mechanism for minimizing the delay path between a processor address and the cache during valid read data operations.

SUMMARY OF THE INVENTION

The cache placement architecture of the invention implements a cache placement algorithm and includes a cache storage unit (CSU) which includes a CSU control logic, an address director, a data director, a placement array, placement logic, a set associative memory for caching data, and a connection between individual cache subsystem components. Any number of CSUs may be connected in parallel to provide a variable size cache. The actual organization and features of the cache placement architectures are determined by the cache implementor, also referred to herein as the circuit designer. A CSU may be a single device, or may include multiple devices. All CSUs sharing a processor interface utilize the same placement block size, contain the same number of sets of cache elements and use the same CSU placement mechanism. The CSU(s) may be in a single device or may be located in multiple devices.

The following advantages result from this approach:

1. A single device type may be used to build an entire cache.
2. Cache size is variable based on the number of devices used.

3. Different device densities may be used in the same system.

4. Cache organization and features are independent of distributed placement.

All cache devices attached to a common processor interface utilize the same placement block size, contain the same number of SETs of cache elements, and use the same placement mechanism to determine which device is the placement device.

The use of distributed cache placement may be applied to all types of caches, several examples of which are described herein. Distributed placement provides an extension to caching not previously available. Distributed placement involves the tracking of the placement across an upgradable cache, normally involving multiple devices.

A system using a single device type called a CSU (Cache Storage Unit) is described as a device for implementing this distributed placement. The implementation of a single CSU may be used to build a cache subsystem having multiple configuration options.

These and other objects and advantages of the invention will become more fully apparent as the description which follows is read in connection with the drawings.

BRIEF DESCRIPTION OF THE DRAWINGS

FIG. 2 is a variation of the basic architecture of FIG. 1.

FIG. 3 is a further variation of the architecture of FIG. 1.

DETAILED DESCRIPTION OF THE PREFERRED EMBODIMENT

Figure 1:
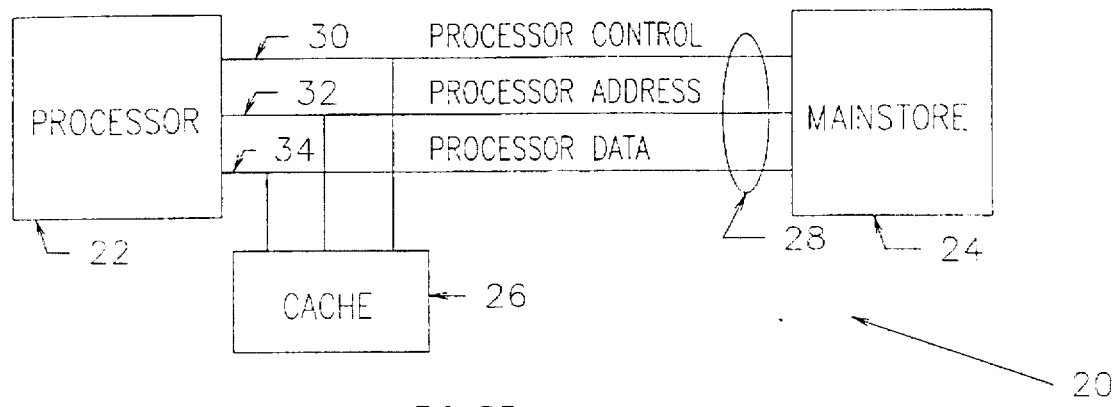
FIG. 1 is a block diagram of a distributed cache placement architecture constructed according to the invention.

A cache subsystem is depicted in three different configurations in FIGS. 1, 2 and 3. The subsystems each contain a cache which is connected to a processor and a mainstore. Each configuration provides the same caching function. The difference is in the manner in which a cache is attached to the processor and mainstore. The attachment, or interface, consists of a control bus, an address bus, and a data bus.

The first configuration, shown in FIG. 1, depicts a system, or cache architecture 20 having a processor 22, a mainstore 24, a cache 26, and a processor interface 28. In this embodiment, cache 26 and mainstore 24 share a processor control line 30, a processor address line 32, and a processor data line 34. Cache 26 and mainstore 24 receive the address and data at the same time. However, mainstore operations are started only after a cache MISS has been detected.

The second configuration, shown in FIG. 2, depicts a cache architecture 40 in which cache 26 buffers a processor interface 42 from the mainstore and which includes a cache-mainstore interface 44, which is also referred to herein as a mainstore interface. In this configuration, cache 26 handles all the mainstore accesses and reads data from mainstore into the cache whenever the cache does not currently contain the information. Processor interface 42 includes a processor control bus 46, a processor address bus 48 and a processor data bus 50. Mainstore interface 44 includes a mainstore control bus 52, a mainstore address bus 54 and a mainstore data bus 56.

The third configuration, shown in FIG. 3, depicts a cache architecture 60 having an operand cache 26a for data and an instruction cache 26b for instructions. These caches may be an integrated structure, or may be constructed as a distinct architecture. Processor 22 is connected to operand cache 26a by an operand interface 62 and to instruction cache 26b by an instruction interface 64. A mainstore interface 66 connects caches 26a and 26b to mainstore 24. Operand interface 62 includes an operand control bus 68, an operand address bus 70 and an operand data bus 72. Instruction interface 64 includes an instruction control bus 74, and instruction address bus 76 and an instruction data bus 78. Mainstore interface 66 includes a mainstore control bus 80, a mainstore address bus 82 and a mainstore data bus 84.

All three configurations use the same basic SET ASSOCIATIVE memory structure. The exact interface or interfaces may be selected from a wide variety of options, with the three configurations shown in FIGS. 1, 2 and 3 as examples. Additional features may be added to the structure shown in these figures. These features enhance the performance of the cache and include: write-back cache operation, sectored TAG organization, addition of a secondary TAG for cache snooping, and cache block prefetch. A second interface, as shown in FIGS. 2 and 3, may be added to further enhance cache operations and speed.

ADDRESS MAPPING

Figure 4:
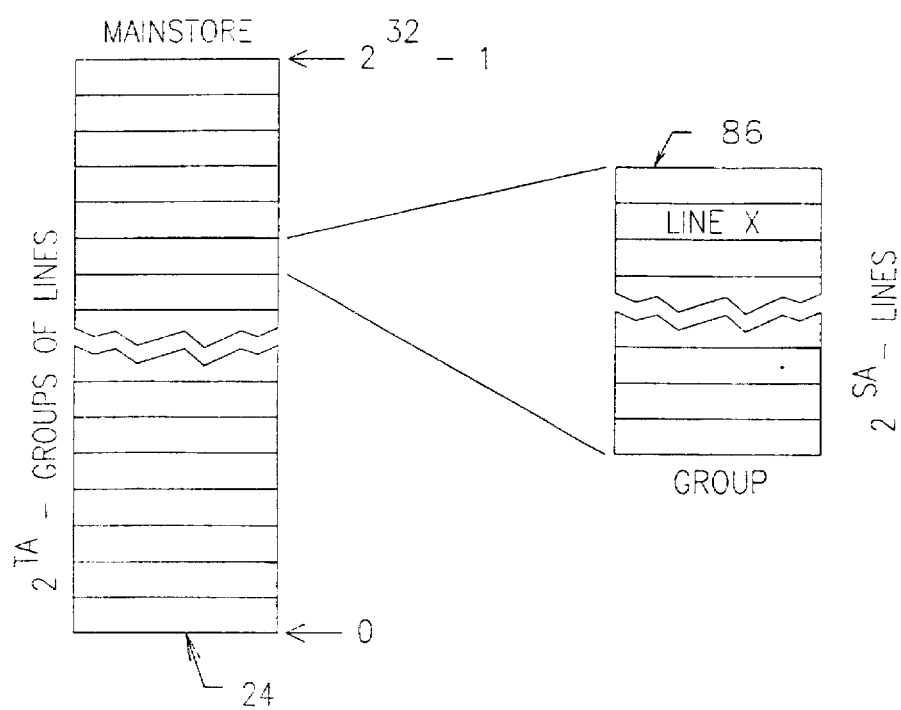
FIG. 4 depicts a mainstorage address mapping scheme.

FIG. 4 depicts the mapping of mainstore 24 addresses into cache 26. In the preferred embodiment, mainstore 24 is one contiguous memory unit, starting at address '0' and ending at address ($2^{32}-1$). The processor address which is sent to cache 26 is divided into three fields, which will be more fully described later herein. For now, the fields are the Set Address field (SA), the TAG Address field (TA) and the Block Address field (BA). Mainstore 24 has $2^{TA}$ GROUPs, such as GROUP 86. Each mainstore GROUP consists of $2^{SA}$ cache lines, with one cache line from each GROUP mapping into its one associated cache set.

Figure 5:
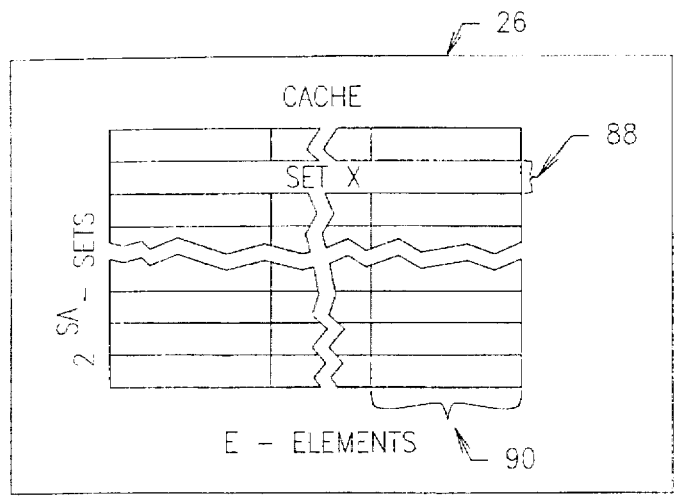
FIG. 5 depicts a cache arrangement for the mapping scheme of FIG. 4.

Referring now to FIG. 5, cache 26 has SA SETs 88, each having 'E' elements 90. 'E' represents the number of places a cache line from mainstore may be placed in the cache. Each cache line from a mainstore GROUP may be placed into any one of the 'E' elements, such as element 90, of its associated cache set. LINE X in FIG. 4 depicts an example of mapping from a line from a mainstore group mapping into cache SET X. The offset from the base of the GROUP and the base of the CACHE is always the same.

The limits of a SET ASSOCIATIVE cache may be illustrated by setting either E or $2^{SA}$ to 1. If E=1, a direct mapped cache is defined wherein each location in mainstore 24 may be placed only in the one element of its SET in the cache. In a fully associative cache, $2^{SA}=1$ and any block in mainstore 24 may be placed in any element of the single SET in the cache.

CACHE SUBSYSTEM

Figure 6:
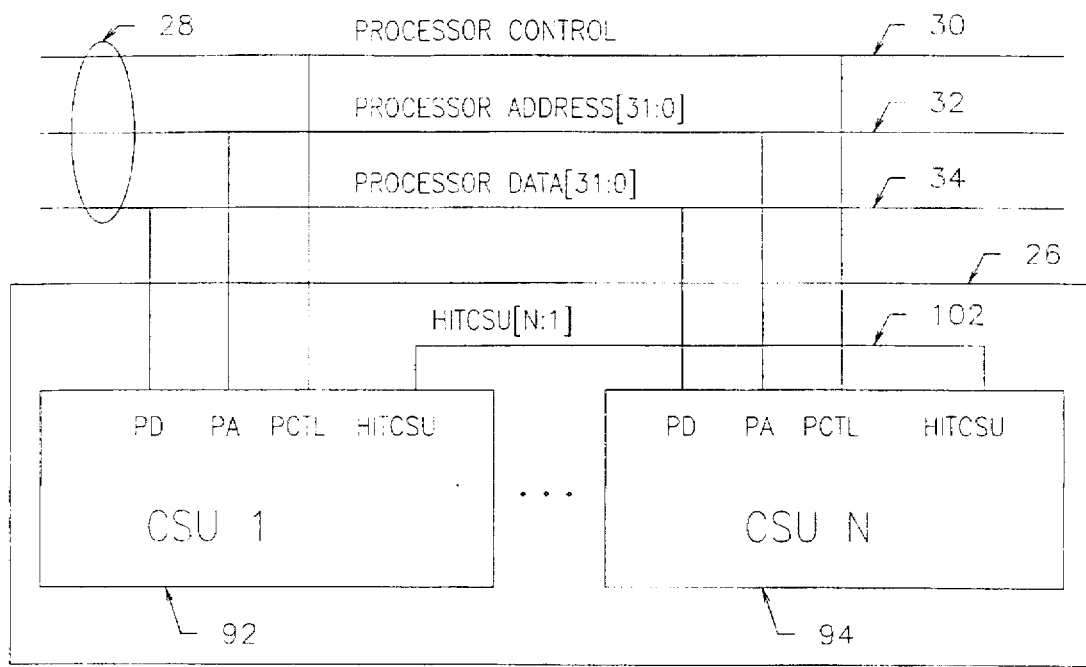
FIG. 6 is a block diagram of a cache subsystem organization (CSU), constructed according to FIG. 2.

Cache 26, as shown in FIG. 6, is made up of 'N' Cache Storage Unit (CSU) devices, such as CSU 1, 92, and CSU N, 94, where 'N' is the maximum number of CSUs available to cache 26 as determined by the CSU implementor. All devices operate in parallel from an interface 28, having, in this embodiment, which corresponds to architecture 20 in FIG. 1, a shared set of PCTL 30 (Processor ConTroL), PA 32 (Processor Address), and PD 34 (Processor Data) lines. As used herein, "line" and "bus" are equivalent structures. A HITCSU line 102 extends between the CSUs and is a structure unique to the distributed cache placement function architecture of the invention, and comprises a portion of what is referred to herein as a communications network.

PCTL signals processor cycle information to the cache and receives information back from the cache. Information signaled to the cache may include; start cycle, cycle type, processor status, cachable cycle, & block transfer requested. Information received back from the cache may include: cycle status, cycle completion, cycle termination, and block transfer status. Other information may be conveyed, depending on the processor used.

The HITCSU lines convey information between devices indicating potential distributed placement order transitions. These lines also serve to communicate the configuration of the system between the devices at system initialization.

CSU ORGANIZATION—FIRST EMBODIMENT

Figure 7:
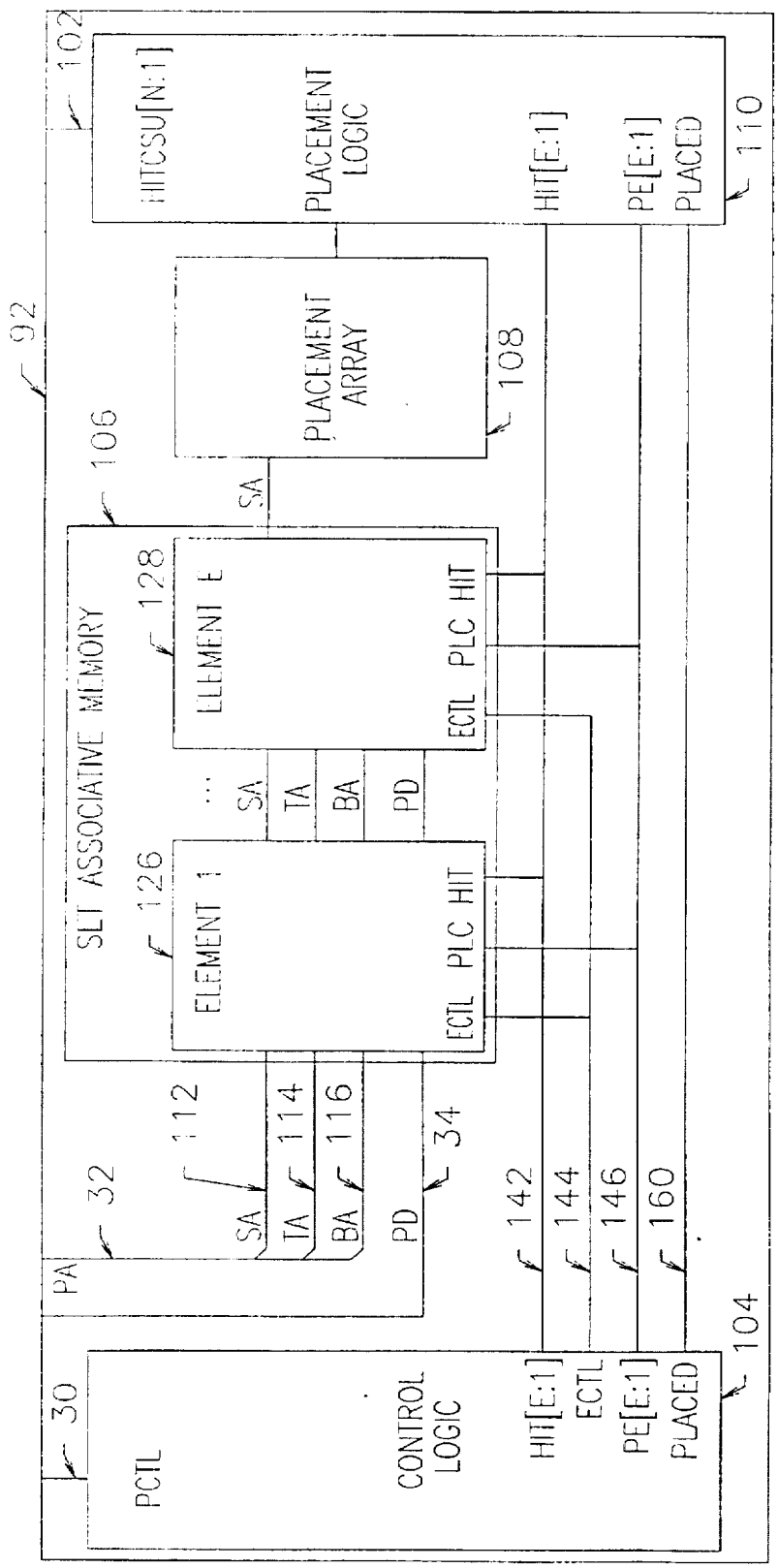
FIG. 7 is a block diagram depicting CSU organization having a HITCSU bus associated therewith.

FIG. 7 depicts a CSU, such as CSU 1, block 92, organization having a CONTROL LOGIC 104, a SET ASSOCIATIVE MEMORY 106, a PLACEMENT ARRAY 108, and a PLACEMENT LOGIC 110.

CONTROL LOGIC

CONTROL LOGIC 104 controls the interface between processor 22, mainstore 24, and CSU 92. The CONTROL LOGIC tracks the state of this interface, interpreting cache accesses and providing cache responses to any cached request from the interface. Internal cache state is also tracked and coordinated by this logic, in cooperation with PLACEMENT LOGIC 110 for accessing one ELEMENT out of the 'E' elements in SET ASSOCIATIVE memory 106, where 'E' can be any number greater than '0'.

TABLE 1

| CACHE OPERATIONS |
| --- |
| Cache Cycle |
| Processor Memory Read<br>Processor Memory Write<br>Location Invalidation |

Table 1 lists the minimum set of operations supported by a WRITE-THRU cache. The processor may support non-cachable memory operations. Processor 22 signals cache 26 whenever an operation is non-cachable. These non-cachable operations are directed to mainstore 24 without a cache reference.

Mainstore 24 may also provide an interface to I/O devices for processor 22. Whenever processor 22 requests an I/O operation, CONTROL LOGIC 104 directs the access immediately to the mainstore interface.

The mainstore interface may be shared with other processors and DMA (Direct Memory Access) I/O devices. A mainstore write by a source other than the processor to which the cache is attached is snooped to determine if the mainstore location is currently present in the cache. If the location is present in the cache, the cache block containing the location must either be invalidated or updated. The common implementation solution is to invalidate the cache block, as this represents the least complex implementation.

PA—PROCESSOR ADDRESS

PA 32 is divided into the three fields. These three fields are the SA, TA, and BA fields and are transmitted over the SA line 112, the TA line 114, and the BA line 116. The SA Set Address field is decoded to select a SET of cache blocks in the CSU. The TA field is the TAG Address. The BA Block Address field selects the desired data within the cache block.

PD—PROCESSOR DATA

PD line 34 provides a bi-directional data path between processor 22 and cache 26. Processor read data is sourced by the cache, during a cache HIT, or by mainstore during a cache MISS. During a cache MISS operation the data coming from mainstore is directed to both the processor and the cache. This data is written to the cache location during the MISS as a result of a placement operation. Processor writes occur to a cache block with a HIT indication. PD for write operations are always directed to both the cache and mainstorage

SET ASSOCIATIVE MEMORY

SET ASSOCIATIVE MEMORY 106 contains at least one element for each SET. CSUs with different numbers of elements can be mixed on the same processor interface. As technology advances, it is foreseeable that device density for CSUs having a greater number of elements will be built which are 100% backward compatible with initial CSUs which may contain as little as one-element-per-SET.

For any processor interface, the total number of elements per SET is the sum of all the elements in all the CSUs attached to this processor interface. Every element in every CSU operates in

TABLE 2

| SET ASSOCIATIVE MEMORY ADDRESSING | | | |
| --- | --- | --- | --- |
| FIELD | ADDRESS RANGE | NAME | FUNCTION |
| BA | (3:0) | BYTE ADDRESS | This field selects data within the cache line down to the byte level. |
| SA | (13:4) | SET ADDRESS | This field selects a SET of cache elements which may contain the mapped cache line from any mainstore GROUP. When this field is used in mainstorage it selects the cache line associated with this set from the GROUP selected by the TA field. |
| TA | (31:14) | TAG ADDRESS | This field stores the value of the mainstore GROUP currently resident in this cache block. When this field is used by mainstorage it selects the GROUP in mainstorage. | parallel simultaneously checking for a HIT on any element in the addressed SET. Changing the number of elements per SET is completely transparent to the system, other than a change in the overall cache HIT ratio.

SET ASSOCIATIVE memory 106 stores data by mapping a set of data locations from mainstorage 24 into the cache 26 as shown in FIG. 6. SET ASSOCIATIVE 106 memory is made up of ELEMENT '1' 126 thru ELEMENT 'E' 128.

Each element contains $2^{SA}$ cache lines. A single address selected by the SA field 112 constitutes a single SET in the SET ASSOCIATIVE MEMORY. All ELEMENTs are accessed in parallel looking for a HIT indication for the selected SET. The cache examples shown use a SET ASSOCIATIVE mapping. The SET ASSOCIATIVE memory cache divides the processor address into the three fields shown in Table 2. Use of the address bits is fixed in the hardware to map mainstore addresses into the cache.

Also shown in Table 2 is an example assignment of these address fields for a processor with 32 address bits. The cache line size is 16 bytes resulting in the BA field being assigned 4 bits (3:0). The number of sets is 1024 requiring 10 SA address bits (13:4). While the remaining 18 bits (31:14) are used in the TA field Still referring to FIG. 7, a HITCSU interface, or line, 102, extends from PLACEMENT LOGIC 110 and is used to communicate with other CSU devices about the interdevice placement tracking. Specifically, the HITCSU line or bus communicates to all other CSUs in the architecture so that each CSU is notified about all events occurring in the other CSUs.

PLACEMENT LOGIC

PLACEMENT LOGIC 110 provides an interface to other CSUs connected to this processor interface and controls the contents of PLACEMENT ARRAY 108. The interface to the other CSUs for this processor interface consists of the HITCSU indication lines 102 interconnecting the devices. PLACEMENT LOGIC 110 is also referred to herein as a distribution controller.

PLACEMENT LOGIC 110 action is dependent on the results of the cache access. The cache access has one of the results and takes the associated action shown in Table III.

The update of PLACEMENT ARRAY 108 always takes into account the steady state active HITCSU indications from every other CSU attached to this processor interface. The state entered by

TABLE 3

CACHE ACCESS PLACEMENT ACTIONS

| CACHE ACCESS RESULTS | PLACEMENT LOGIC ACTION |
| --- | --- |
| HIT in this CSU with every entry valid. | Assert HITCSU 102 and update both the CSU placement and entry placement portions of the PLACEMENT ARRAY 108. |
| HIT this CSU with at least one entry invalid. | Update the entry placement but not the CSU placement portions of the PLACEMENT ARRAY 108 without asserting HITCSU 102. |
| MISS this CSU with a HIT indication from another CSU. | Update both the CSU placement portion but not the entry portion of the PLACEMENT ARRAY 108. |
| MISS in every CSU when this CSU is not the placement CSU. | Monitor mainstore access by placement CSU. When placement CSU finally gives the delayed HIT indication 104, update the CSU placement portion of the PLACEMENT ARRAY 108. |
| MISS in every CSU when this CSU the placement CSU and every entry is valid. | The placement entry is selected by the internal PLC'X' line, where 'X' is an entry between 1 & 'N'. The CSU CONTROL LOGIC also receives the PLC'X' indication and does a placement access to mainstore. Simultaneously with the assertion of the HIT indication by the CSU CONTROL LOGIC 104 the HITCSU line 102 is asserted. Update then occurs to both the CSU placement and entry placement portions of the PLACEMENT ARRAY 108. |

TABLE 3-continued

CACHE ACCESS PLACEMENT ACTIONS

| CACHE ACCESS RESULTS | PLACEMENT LOGIC ACTION |
| --- | --- |
| MISS in every CSU when this CSU the placement CSU and at least one entry is invalid. | The placement entry is selected by the internal PLC'X' line, where 'X' is an entry between 1 & 'N'. The CSU CONTROL LOGIC also receives the PLC'X' indication and does a placement access to mainstore. Update then occurs to the entry placement but not the CSU placement portion of the PLACEMENT ARRAY without asserting HITCSU. |

PLACEMENT ARRAY 108 when this CSU has a HIT is the state that would have been entered after receiving subsequent HITCSU indications from those other CSUs with HITCSU always in an asserted state. This feature allows use of less than the maximum number of CSUs on a processor interface.

Invalidation operations, whether from the processor or mainstore, do not alter the placement order. All HITCSU indications are ignored by every CSU attached to a processor interface during an Invalidation operation.

PLACEMENT ARRAY

For each SET ASSOCIATIVE MEMORY 106, PLACEMENT ARRAY 108 stores information indicating the placement CSU as well as the placement element within this CSU. The SA address bits select placement data for this SET from the PLACEMENT ARRAY. Data stored here indicates:

1. The CSU placement portion contains information on the position in the placement algorithm of this CSU relative to every other CSU on this processor interface. When this CSU has the lowest position according to the placement algorithm it is the placement CSU.

2. The element placement portion contains information regarding the placement order of every element in this CSU. The data stored here is determined by the placement algorithm chosen, which may be a different algorithm from the external CSU placement algorithm. This field is not used when the CSU contains a single element.

A SET OF ELEMENTS

Figure 8:
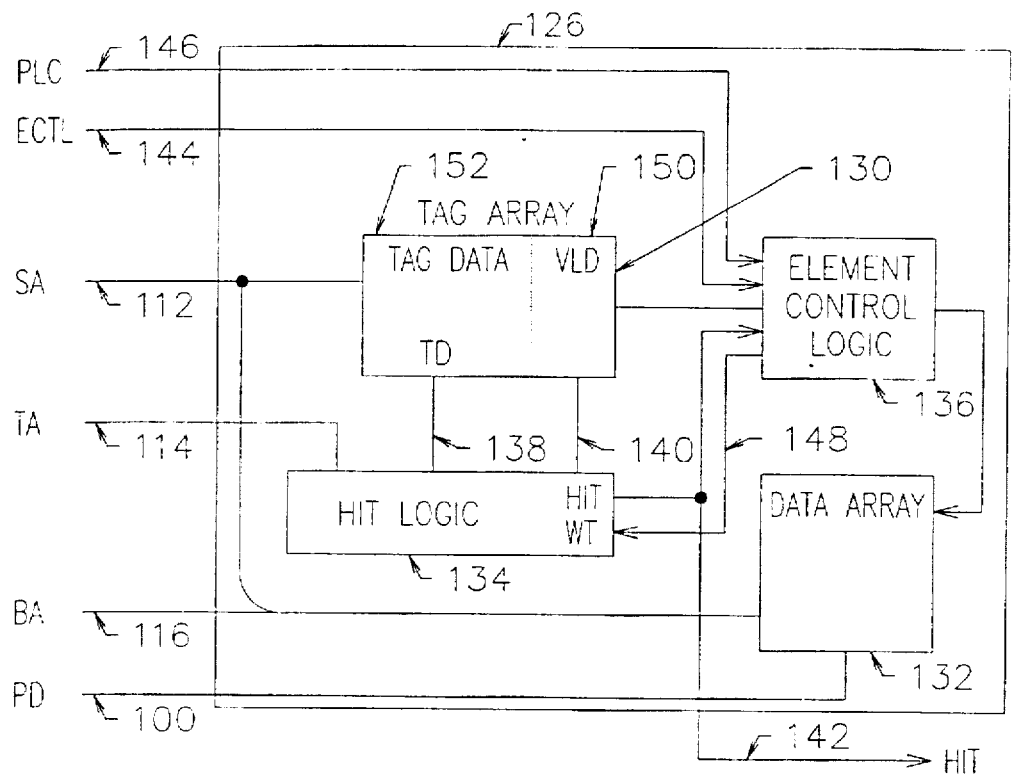
FIG. 8 depicts the architecture of an element.

Referring now to FIGS. 7 and 8, the contents of each element in the SET ASSOCIATIVE MEMORY will be discussed. SET ASSOCIATIVE MEMORY 106 includes one or more elements, or element sets 1 through E, depicted at 126, 128, respectively. Each ELEMENT contains $2^{SA}$ cache lines and consists of a TAG ARRAY 130, its associated DATA ARRAY 132, HIT LOGIC 134, and ELEMENT CONTROL LOGIC 136.

As previously noted, the PA is divided into three fields, shown in Table II, for addressing an element. The SA field selects the SET that is being currently accessed by the processor. When the SET has been selected by the SA field, the TA field bits are compared to the respective TD data 138 stored in that TAG location, and if every TD bit matches its respective TA bit, and the VLD (VaLiD) bit 140 is also set, a cache HIT has occurred. The BA 116 combined with the SA 112 field select a location in the data storage and when a HIT 142 occurs, a data transfer is performed on DATA bus 116.

ELEMENT CONTROL LOGIC

CONTROL LOGIC 104 provides an indication to LOGIC 136 (FIG. 8) of the type of operation being performed. The ELEMENT CONTROL LOGIC 136 in each ELEMENT 126, 128, provides an indication to CONTROL LOGIC 104 and PLACEMENT LOGIC 110 as to whether or not a HIT occurred in this CSU. Receiving a HIT 142 indication from an element causes CONTROL LOGIC 104 to send a completion indication to the requesting interface. When a HIT does not occur within this CSU (92 . . . 94), the PLACEMENT LOGIC gives an indication to the CONTROL LOGIC on the PE Placement Element 146 line to the CONTROL LOGIC and each ELEMENT if this is the placement CSU and which ELEMENT of the SET is to be replaced. When the CONTROL LOGIC has finished the PLACEMENT operation it indicates this completion on the PCTL to the processor and the PLACED line 160 to the PLACEMENT LOGIC 110.

ELEMENT CONTROL LOGIC 136 receives signals from CONTROL LOGIC 114 indicating the type of operation to perform (see FIG. 7) on ETCL line 144. When a MISS has occurred, selection of this element as the placement element is indicated by the PLACEMENT LOGIC 110 on PLC line 146. When the ELEMENT LOGIC receives a HIT indication signal from the HIT LOGIC on HIT line 142, the desired data operation is performed on DATA ARRAY 132 or on TAG ARRAY 130, as shown in Table 4.

TABLE 4

ELEMENT DETAILS DIAGRAM

| Memory Read | Drive DATA ARRAY 132 contents on PD bus. |
|---|---|
| Memory Write | Data from PD written to DATA ARRAY 132. |
| Location Invalidate | Write VLD bit 150 in TAG ARRAY to a '0'. |
| Place Line | Write VLD bit 150 in TAG ARRAY to a '1', write line from mainstore into data array, & write TA field from address into the TAG DATA 152 array. |

An element placement occurs by updating both TAG ARRAY 130 and DATA ARRAY 132. Multiple data transfers normally occur when placing a cache placement block in DATA ARRAY 132. Only a single write update occurs to the TAG ARRAY 130. The TAG ARRAY update always sets VLD bit 140 during a placement operation.

The update of TAG ARRAY 130 requires a write indication at the same time the TA address field is gated to TD 138. This is shown in HIT LOGIC 134 (FIG. 9) and is controlled by the assertion of a write tag (WT) signal on WT control line 148 from ELEMENT CONTROL LOGIC 136.

TAG ARRAY

TAG ARRAY 130 contains the mainstore TAG (Target Address) and state information about a particular cache block. Each element in the TAG ARRAY covers one cache block. FIG. 8 depicts a VLD bit in the TAG state information 150 that is the minimum required for standard cache operation. The TAG DATA 152 stores upper order address bits from the TA field as data.

The state information for the cache block may be extended to include additional information about a cache block. This extended information may be used in support of additional cache features.

HIT LOGIC

Figure 9:
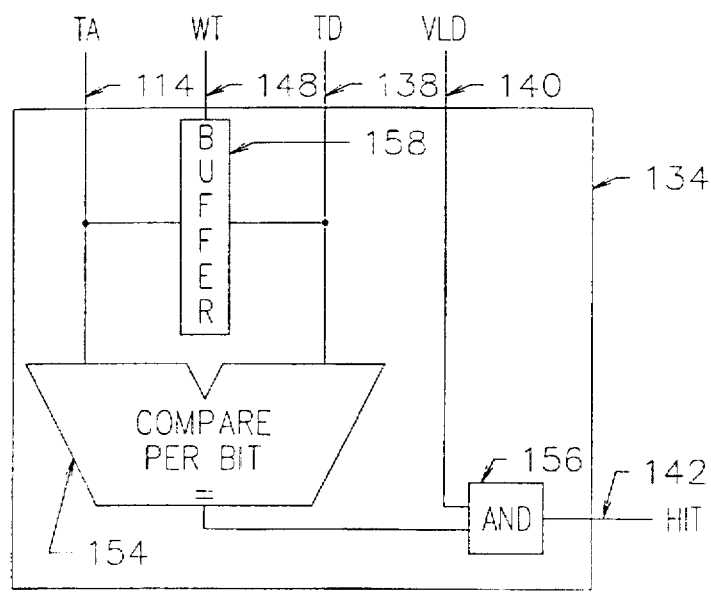
FIG. 9 depicts the architecture of the HIT logic of an element.

Referring now to FIG. 9, HIT LOGIC 134 determines when to signal a HIT for this element of this SET to PLACEMENT LOGIC 110 and ELEMENT CONTROL LOGIC 136.

A HIT is defined to occur on the ELEMENT whenever the selected SET of TD bits from TAG ARRAY 130 matches the TA address bits from processor 22, and the VLD bit is set.

FIG. 9 depicts the condition of HIT LOGIC 134 where the results of the bit-wise compare, block 154, of each pair of TA 114 and TAG DATA 138 bits are ANDed, block 156, with the VLD bit 140 set to generate a HIT indication, which is transmitted on HIT line 142.

A signal on WT control line 148 is asserted by ELEMENT CONTROL LOGIC 136 upon a TAG ARRAY write. The data written into TAG ARRAY 130 is the TA field from the address. Buffer 158 provides a path during a cache placement operation for such data.

DATA ARRAY

Referring now to FIG. 8, DATA ARRAY 132 contains blocks of memory which are copied from mainstore 24. Processor memory references, both reads and writes, are handled by DATA ARRAY 132 during all cache HIT references which occur in its associated TAG ARRAY.

PLACEMENT LOGIC

Returning now to FIG. 7, PLACEMENT LOGIC 110 controls the contents of PLACEMENT ARRAY 108. PLACEMENT LOGIC action is dependent on the results of the cache access. The cache access has one of the results, and takes the associated action, shown in Table 5. The placement algorithm is implemented here. The placement algorithm may be one of many known alternatives including, but not limited to LRU (Least Recently Used), FIFO (First In First Out), or B-tree (Binary tree structure). Successful placement of a data line results in the transmission of a PLACED signal on PLACED line 160 from PLACEMENT LOGIC 110 to CONTROL LOGIC 104.

PLACEMENT ARRAY

For each associative memory SET, PLACEMENT ARRAY 108 stores information indicating the placement element within this CSU. The SA address bits select placement data for this SET from

TABLE 5

PLACEMENT LOGIC ACTIONS

| ACCESS RESULTS | PLACEMENT LOGIC ACTION |
|---|---|
| HIT | Assert HIT and update the PLACEMENT ARRAY. |
| MISS - all elements valid. | The placement element is selected based on the state of PLACEMENT ARRAY the by the internal PLC'X' line, where 'X' is an element between 1 & 'E'. The CONTROL LOGIC receives the PLC'X' indication and does a placement access to mainstore. The PLACEMENT ARRAY is updated to indicate a HIT just occurred to the new mainstore location. |
| MISS - any element invalid. | An invalid element is selected by the internal PLC'X' line, where 'X' is an element between 1 & 'E'. The CONTROL LOGIC receives the PLC'X' indication and does a placement access to mainstore. The PLACEMENT ARRAY is updated to indicate a HIT just occurred to the new mainstore location. | the PLACEMENT ARRAY. It should be appreciated that separate CSU devices, such as the TAG and data devices, may be provided in the architecture rather than the unitary structure which is described in the preferred embodiment.

CSU ORGANIZATION—SECOND EMBODIMENT

Figure 10:
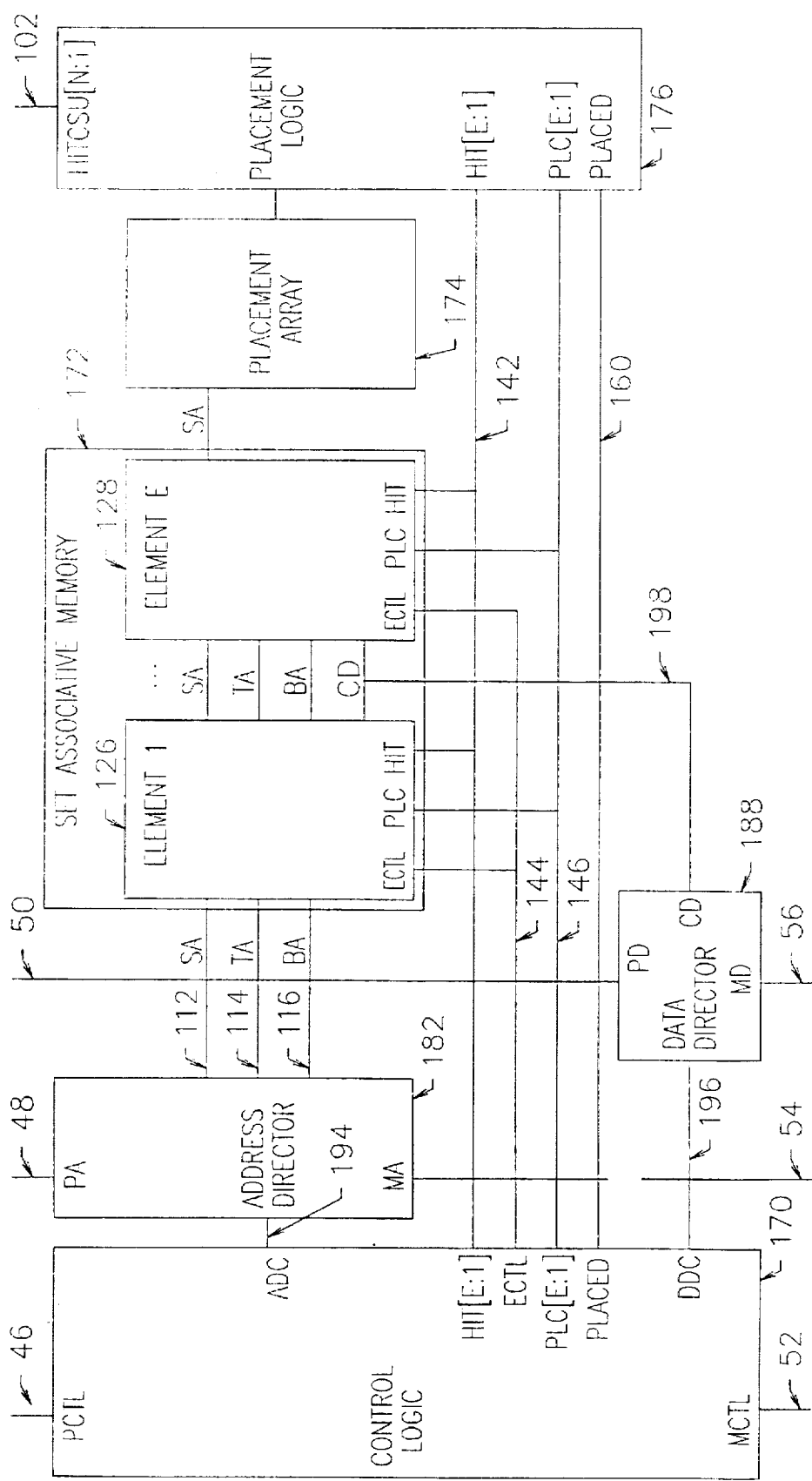
FIG. 10 is a block diagram of a CSU organization constructed according to FIG. 3.

Architecture 40 in FIG. 2 has the organization shown in FIG. 10. This configuration includes CONTROL LOGIC 170, SET ASSOCIATIVE MEMORY 172, PLACEMENT array 174, and placement logic 176. These devices may have the same structure and configuration as those like named devices shown in FIG. 7. Processor Interface 42 is connected to CONTROL LOGIC 170 by PCTL line 46, while the second interface, or mainstore interface 44 is connected to control logic by MCTL (Mainstore ConTroL) line 52. This configuration isolates the processor references to the cache from the mainstore. In this configuration, the CSU includes two additional components, the first of which is an address director 182, which is connected to the address buses of the interfaces by a PA line 48 and a MA (Mainstore Address) line 54. The second additional component is a data director 188 which is connected to the interfaces by a PD line 50 and a MD (Mainstore Data) line 56.

The address sent to SET ASSOCIATIVE MEMORY 172 and PLACEMENT ARRAY 174 is determined by CONTROL LOGIC 170 which is connected to ADDRESS DIRECTOR 182 by Address Director Control (ADC) line 194. The MA address may be directed to SET ASSOCIATIVE MEMORY 172 or the PA address may be directed to SET ASSOCIATIVE MEMORY 172.

The data sent to SET ASSOCIATIVE MEMORY 172 is connected by a Cache Data (CD) line 198 to DATA DIRECTOR 188. A DATA DIRECTOR CONTROL (DDC) line 196 extends from CONTROL LOGIC 170 and directs the DATA DIRECTOR to direct either the PD 50 or MD 56 data to CD line 198.

CONTROL LOGIC

CONTROL LOGIC 170 is similar to that depicted in FIG. 7. A Mainstore ConTroL (MCTL) line 52 is added as an interface to mainstore 24. MCTL signals the mainstore operation cycle type, request status, and operations by Direct Memory Access (DMA) or other processors.

The CONTROL LOGIC tracks the state of both the processor and mainstore interfaces interpreting cache accesses for them and providing cache responses to any cache request from either interface.

The CONTROL LOGIC determines whether the interface doing the access currently accessing the SET ASSOCIATIVE MEMORY and PLACEMENT array is the processor or the mainstorage interface. When the access is from the processor the PA and PD are the source of the address and data respectively for the SET ASSOCIATIVE MEMORY and PLACEMENT array. When the access is from the mainstorage, the MA and MD are the source of the address and data respectively for the SET ASSOCIATIVE MEMORY and PLACEMENT array.

ADDRESS DIRECTOR

ADDRESS DIRECTOR 182 controls the path of an address from its source to its destination(s). Address sources are processor interface 42 and mainstore interface 44. Address destinations are cache 26 and mainstore interface 44. The ADDRESS DIRECTOR also divides the PA or MA into the three fields required by SET ASSOCIATIVE memory 172.

Many operations will direct the signal on PA line 48 through address director 182 to MA line 54. Whenever the mainstorage interface is not busy, the signal on PA line 184 is directed to MA line 54. This saves the time required to drive the interface after a cache MISS or processor write operation to mainstore.

PA is not directed to the mainstore interface when another device is using the mainstore interface. At this time the processor must wait to acquire the mainstore interface before driving the MA lines.

DATA DIRECTOR

DATA DIRECTOR 188 provides a data path from a single source to one or more destinations. All three data connections PD 50, MD 56 and CD 198 to the DATA DIRECTOR are bi-directional.

Processor read data has as its source either the cache or the mainstore interface. Processor read data is sourced by the cache, during a cache HIT, or by mainstore during a cache MISS. During a cache MISS operation the data coming from mainstore is directed to both the processor and the cache. This data is written to the cache location as a result of the placement operation.

Writes to mainstore from other sources do not cause data transfers to or from the cache, but do cause an invalidation of any cache location with a HIT indication.

CSU ORGANIZATION—THIRD EMBODIMENT

Figure 11:
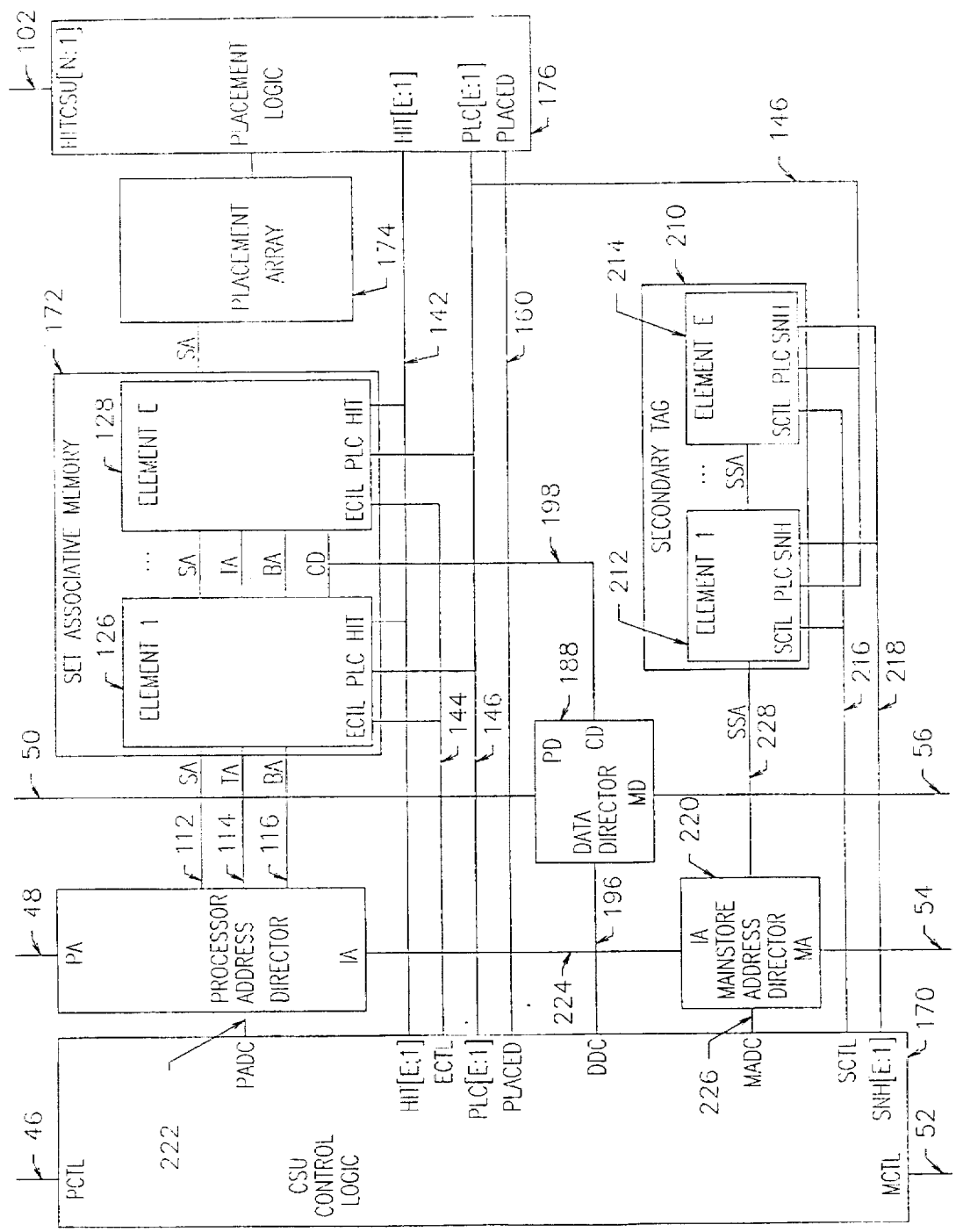
FIG. 11 is a block diagram of an alternate embodiment of the CSU of FIG. 3, having a secondary TAG architecture.

The configuration of cache 26 in the third embodiment, shown in FIG. 11, is the same basic cache as that used in FIG. 10. The difference is in the use of the cache. In this embodiment, a cache is dedicated to the instruction stream and a second cache is dedicated to use by processor data references

ADDITIONAL CACHE FEATURES

The operation of the cache may be enhanced in a number of ways to improve overall system performance. The following is a description of such additional features which may be added to the previously described CSU, and include the provision of WRITE-BACK Operations, the provision of a SECONDARY TAG, a PREFETCH capability, and INVALIDATION capabilities.

SECONDARY TAG

With the single set of TAG elements, shown in FIGS. 7, 8 and 10, every reference from either the processor or mainstore interface must access the TAG elements in the SET ASSOCIATIVE MEMORY. This may be adequate for some implementations, but requires time multiplexing of the TAG between mainstore and processor references. This time multiplexing works when idle time is available to read the TAG from the mainstore interface between processor references. Otherwise the mainstore references cause the processor to wait until the completion of the mainstore TAG reference before continuing operation.

Adding a secondary TAG solves the conflict associated with accessing the TAG array. Such a configuration is depicted in FIG. 11, which is a modification of the configuration of FIG. 10, and which uses like reference numbers. This configuration is most effective when used for multiprocessing applications. A secondary TAG contains a copy of the TAG data used by the processor. Mainstore references from sources other than the processor to which the cache is attached now only access the primary TAG in SET ASSOCIATIVE MEMORY 172 when the secondary TAG has a HIT. The probability of a HIT on the secondary TAG from other sources referencing mainstorage is low, meaning an insignificant number of processor or primary TAG references occur from the mainstore interface.

The SET ASSOCIATIVE MEMORY 172 handles all the data references to the cache. Placement operations to the cache occur to both the TAG of SET ASSOCIATIVE MEMORY 172 and SECONDARY TAG 210 at the same time.

FIG. 11 depicts a cache with a secondary TAG, which is based on the configuration of FIG. 10, and which incorporates, where applicable, like reference numbers, having a secondary TAG array 210. Secondary tag 210 includes elements 1 . . . E, 212 . . . 214, respectively, which are connected to CONTROL LOGIC 170 by Secondary ConTroL (SCTL) line 216 and SNoop Hit (SNH) line 218.

In addition to Secondary TAG 210, the address director has been replaced by two address directors to improve performance by allowing parallel access to the two TAG arrays within the SET ASSOCIATIVE MEMORY. The MAINSTORE ADDRESS DIRECTOR 220 provides the paths between the MA 54, Internal Address IA 224 and Secondary SA (SSA) 228 lines while the PROCESSOR ADDRESS DIRECTOR provides the paths between the PA 48, IA 224, SA 112, TA 114 and BA 116 lines.

A Processor Address Director Control (PADC) line 222 controls the source and destination of the PA, IA, SA, TA and BA. The normal path is to the divided address SA, TA and BA to the SET ASSOCIATIVE memory. Use of IA line 224 is coordinated with the MADC line 226 to the MAIN-STORE ADDRESS DIRECTOR, as IA can only have one source at a time.

The MADC lines 226 control the source and destination of the MA, SSA and IA. The normal path is to the SSA, which is the same group of addresses used for the SA lines to the processor TAG, to the secondary TAG. Use of the IA bus is coordinated with the PADC lines to the PROCESSOR ADDRESS DIRECTOR as IA can only have one source at a time.

CONTROL LOGIC complexity has increased. References to the SECONDARY TAG which cause a HIT result in the activation of the associated SNH line 218. When the CONTROL LOGIC receives a SNH indication the MADC 226 directs the MAINSTORE ADDRESS DIRECTOR to direct the signal on MA line 186 to IA line 224. Simultaneously the PADC 222 directs the PROCESSOR ADDRESS DIRECTOR to direct the respective bits from the IA 224 bus to the SA 112, TA 114 and BA 116 lines. References from the processor which MISS the cache are directed in the reverse manner over the IA bus down to the MA bus. SCTL 216 controls the SECONDARY TAG in a manner similar to the ECTL 144, lacking the control of the data array. SNH[E:1] provides the indications of SECONDARY TAG HITs on the respective elements.

The secondary TAG refers to a second set of TAG array elements identical to the TAG array elements in the SET ASSOCIATIVE MEMORY. The secondary TAG elements 212 ... 214 differ from that shown in FIG. 8 in that DATA ARRAY 132 is not provided in a secondary TAG element. Whenever a data transfer is required from the cache after a HIT on the secondary TAG the SET ASSOCIATIVE MEMORY is accessed to obtain the data. PLC line 146 is connected to the respective elements in the SECONDARY TAG 210 as the SET ASSOCIATIVE MEMORY for line placement operations.

WRITE-BACK OPERATION

All the configurations shown in FIGS. 1–3 may be configured with either be a WRITE-THRU cache or a WRITE-BACK cache. The WRITE-THRU cache causes all write operations to write to mainstore as well as updating cached locations. A WRITE-BACK cache does most write operations only to the cache DATA ARRAY with a mainstore write required only one time, when the cache block is the placement cache block on a cache MISS.

The WRITE-THRU function is a simple and straight forward implementation. Little concern is required to ensure that references to mainstore always reference only the most current copy of data in the system. Mainstore always contains the most recent data copy and is the only place a reference needs to go to obtain the correct copy of a data location.

Figure 12:
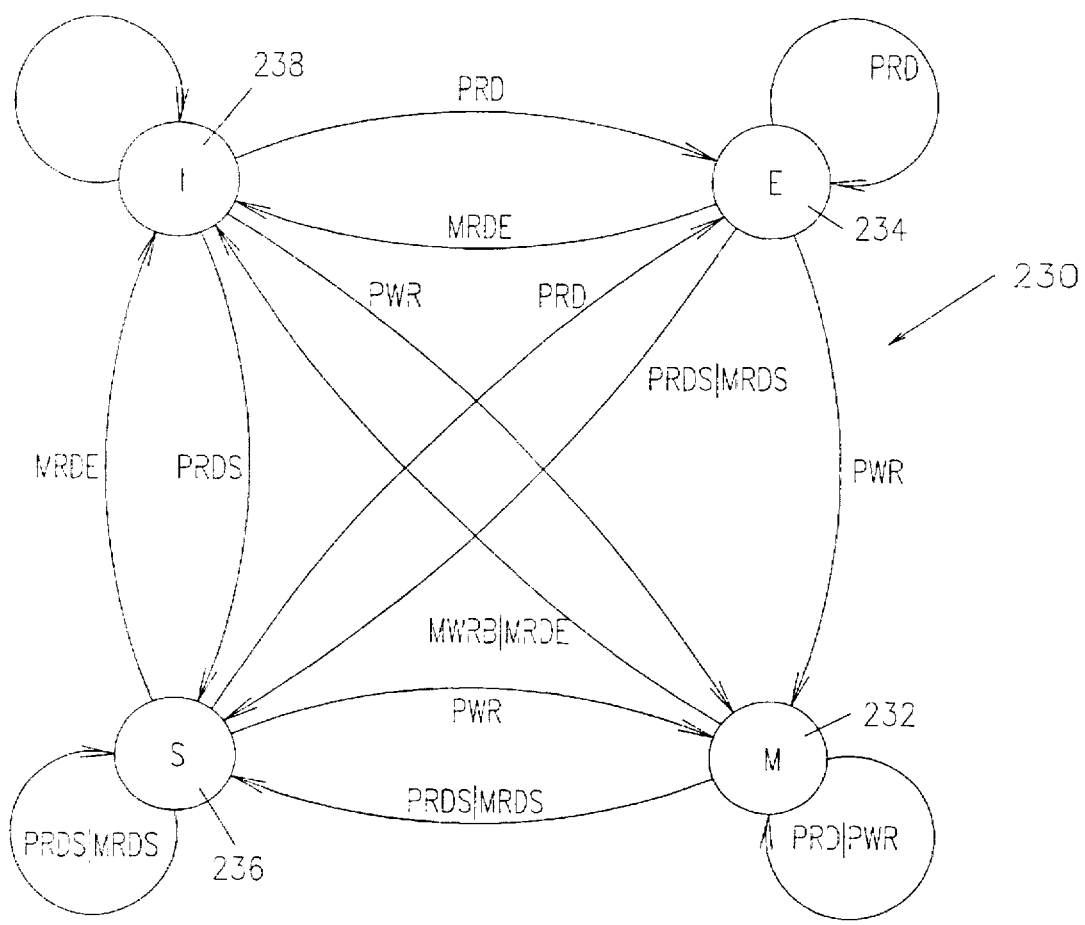
FIG. 12 is a block diagram of a MESI state machine.

Mainstore references from another source in the system with a WRITE-BACK cache are more complex than a system with a WRITE-THRU cache. A simple invalidation of the cache block is no longer adequate with the WRITE-BACK cache since the cache block may be the only current copy of the data in the system. This copy of the cache block must either be written to mainstore or copied to another cache. A protocol for handling the mainstore references must be implemented to handle the data transfers between mainstore and the caches, or in some cases from one cache to another cache An example of such a WRITE-BACK protocol is the MESI protocol, an example of which is depicted in FIG. 12, at 230. MESI is an acronym representing the four possible states for each cache block. This is double the number of WRITE-THRU cache block states. Each letter in MESI represents a cache block state that is described in following paragraphs.

M Modified (block 232)—This cache block contains data that has been modified. The copy of data in mainstore is invalid. The processor interface may write this block without any reference to mainstore. This is the only cache in the system that contains a valid copy of this data block at this time. A Reference to this mainstore block from any other source in the system requires this cache furnish the data to the requester, or write the data to mainstore, then leave the modified state. New possible states are Invalid or Shared.

E Exclusive (block 234)—This cache block is set aside for the exclusive use of this processor interface. The processor interface may write this block without any reference to mainstore making a transition to the Modified state. References to this mainstore block from any other source in the system require the cache block leave this state to the I or S state. New possible states are Modified, Invalid or Shared.

S Shared (block 236)—This cache block may be present in other caches in the system. The processor interface must first request an exclusive or modified state transition at the mainstore interface before this block may be written. This cache block is invalidated when another cache requests this block without a shared indication.

I Invalid (block 238)—This cache block is Invalid and may not be used without first obtaining a copy of the data from the mainstore interface. State transitions may occur to any other state dependent on the type of operation required.

An implementor might chose the following set of operations for its mainstore interface operations for cachable memory blocks. The transitions between the above states are shown for these operations in FIG. 12.

MRDS Mainstore Read Shared—Read the data from its current location with no intention of modification by the requester MRDE Mainstore Read Exclusive—Read the data from its current location with the intention of modification by the requester. Obtain the right to modify the data without a mainstore reference.

MWRB Mainstore Write Block—Write a modified block back to mainstore. This occurs whenever a placement needs to use a cache block holding modified data.

The processor used in this implementation example has the following cachable memory operations.

PRDS Processor Read Shared—Read the data from its current location with no intention of modification by the requester.

PRD Processor Read—Read the data from its current location with the intention of modification by the requester. Obtain the right to modify the data without a mainstore reference.

PWR Processor Write—Write a location in memory.

The state machine of FIG. 12 does not show all the details involved in placing a block in cache. The cache block must first be checked to determine if it is in the M state and written back to mainstore before cache block invalidation takes place in preparation for the new placement block. Only the transitions possible once the placement block has been invalidated are shown in FIG. 12.

CACHE PREFETCH STRATEGY

The cache fetch strategy can vary from a simple fetch on a cache MISS to a complex mechanism for predicting the next data the processor may use. The first mechanism is simple and only reads new data from mainstorage as a result of a cache MISS. The predictions mechanisms are numerous, but two examples are prefetch always and tagged prefetch.

PREFETCH ALWAYS

The prefetch always causes a prefetch reference to mainstorage for the next consecutive block of data in mainstorage any time it is not present in the cache. This mechanism results in many more mainstorage references than other prefetch mechanisms, and sometimes invalidates data that the processor will be using again.

TAGGED PREFETCH

A second mechanism is a tagged prefetch mechanism, where a special prefetch bit is used in each TAG. Each time a MISS occurs two data blocks are read from system memory, the first is the block sought by the processor, and the second is a prefetched block and the prefetch bit is set on the prefetched block. A reference to a block with the prefetch bit set results in the next sequential block being read from mainstorage, and the prefetch bit being reset in the referenced TAG block. The newly prefetched block has its prefetch bit set, waiting for a reference to it to start another prefetch operation.

PREFETCH BUFFER

A prefetch buffer could be used with either of the above approaches instead of actually placing the information into the cache, thereby minimizing the impact of the prefetching on processor performance. The prefetch buffer contains one or more TAG block buffers and when a prefetch occurs the data is held in the prefetch buffer until it is actually referenced by the processor. Multiple prefetch blocks in the buffer would support multiple instruction and data streams. The prefetch buffer is referenced at the same time as the cache, when a prefetch block has a HIT it would cause the next block to be read from mainstorage, while it would be placed into the cache. When a simultaneous cache MISS and prefetch buffer MISS occurs the oldest prefetch buffer block is replaced with the next consecutive mainstorage block after the block which caused the cache MISS. This shows a little of the complexity prefetch can take on, but it could increase the cache HIT ratio substantially

INVALIDATION

Invalidation of data in a cache can take place at several levels, from the transfer block up to the full cache. The transfer block invalidation is a requirement as any reference from another processor can cause a request that invalidates the data currently cached. A full cache could be invalidated using transfer block level invalidation, however, a general clear mechanism is very useful for power on reset as well as supporting software invalidation. Software invalidation may be required as a result of context switches, hardware errors, or certain software lockup bugs in a system.

CSU INITIALIZATION

System initialization occurs using a special cache clear or RESET line. The assertion of this RESET line to the CSU
1) Resets all the cache block VLD bits, and
2) initializes the PLACEMENT ARRAY for each SET in each CSU to a known order.

Figure 13:
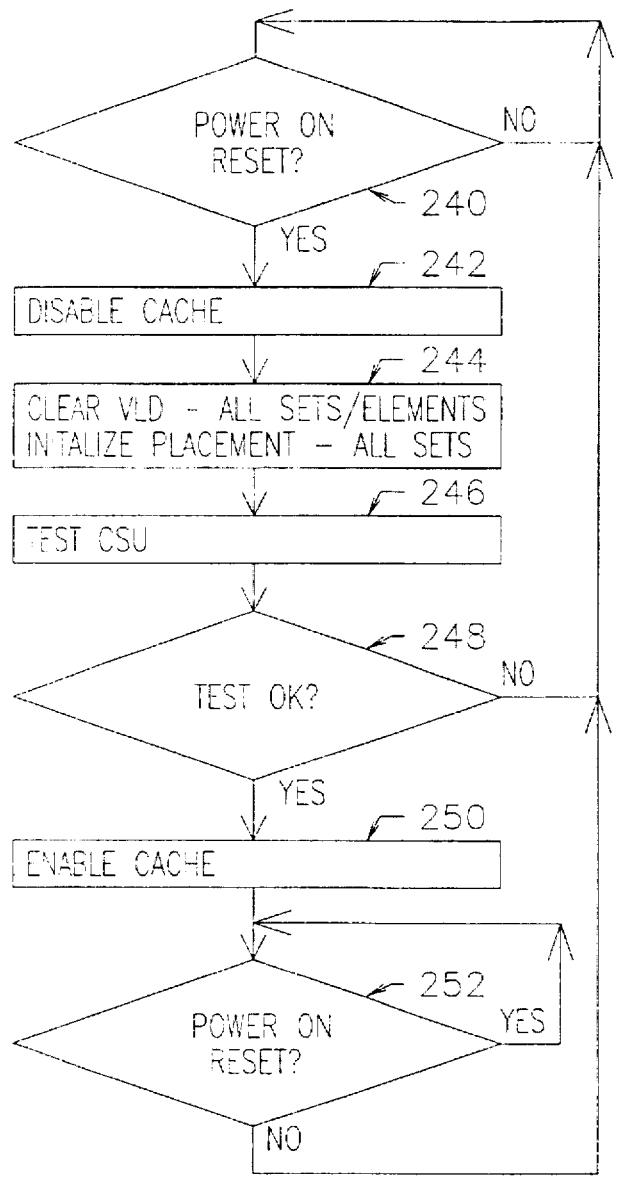
FIG. 13 is a power-on flow chart.

FIG. 13 is a flow chart showing the initialization of a CSU. Flow occurs from top to bottom and left to right in FIG. 13, unless an arrow indicates otherwise. Each CSU in a system executes this operation in parallel.

POWER ON RESET, block 240, occurs as a result of the assertion of the RESET line either from application of power, or from a RESET switch. This disables the CSU, block 242.

Once the CSU is disabled from operation the initialization of each SET occurs, block 244. The CSU must either internally step through each SET setting the initial conditions, or simultaneously set the initial state in every SET.

The initial state of every SET is the same. Every SET has all its elements in the invalid state. The PLACEMENT ARRAY has the CSU placement portion set to a value dependent on the position of this CSU on the processor interface. While the element placement portion of the PLACEMENT ARRAY is set to an internally determined placement assignment.

Placing the TAG ARRAY in the invalid state is adequate to start system operation as the invalid state for a TAG causes all other information associated with the TAG to be ignored.

TEST CSU, block 246, is a function carried out internal to the device. The test is optional and may be omitted. The nature and extent of the testing, if conducted, is left to the choice of the circuit implementor. However, the test should at least verify that all the VLD bits 140 are cleared and all the PLACEMENT ARRAY locations have the correct initial values.

Following a successful test, block 248, the CSU enables itself, block 250. The CSU then waits for the POWER ON RESET, block 252, to terminate before allowing standard system operation to begin. At this point all locations of the CSU are invalid and all memory references will result in a cache MISS. Although the procedures of blocks 246 and 248 should be provided, the procedures are optional.

CSU OPERATIONS

Figure 14:
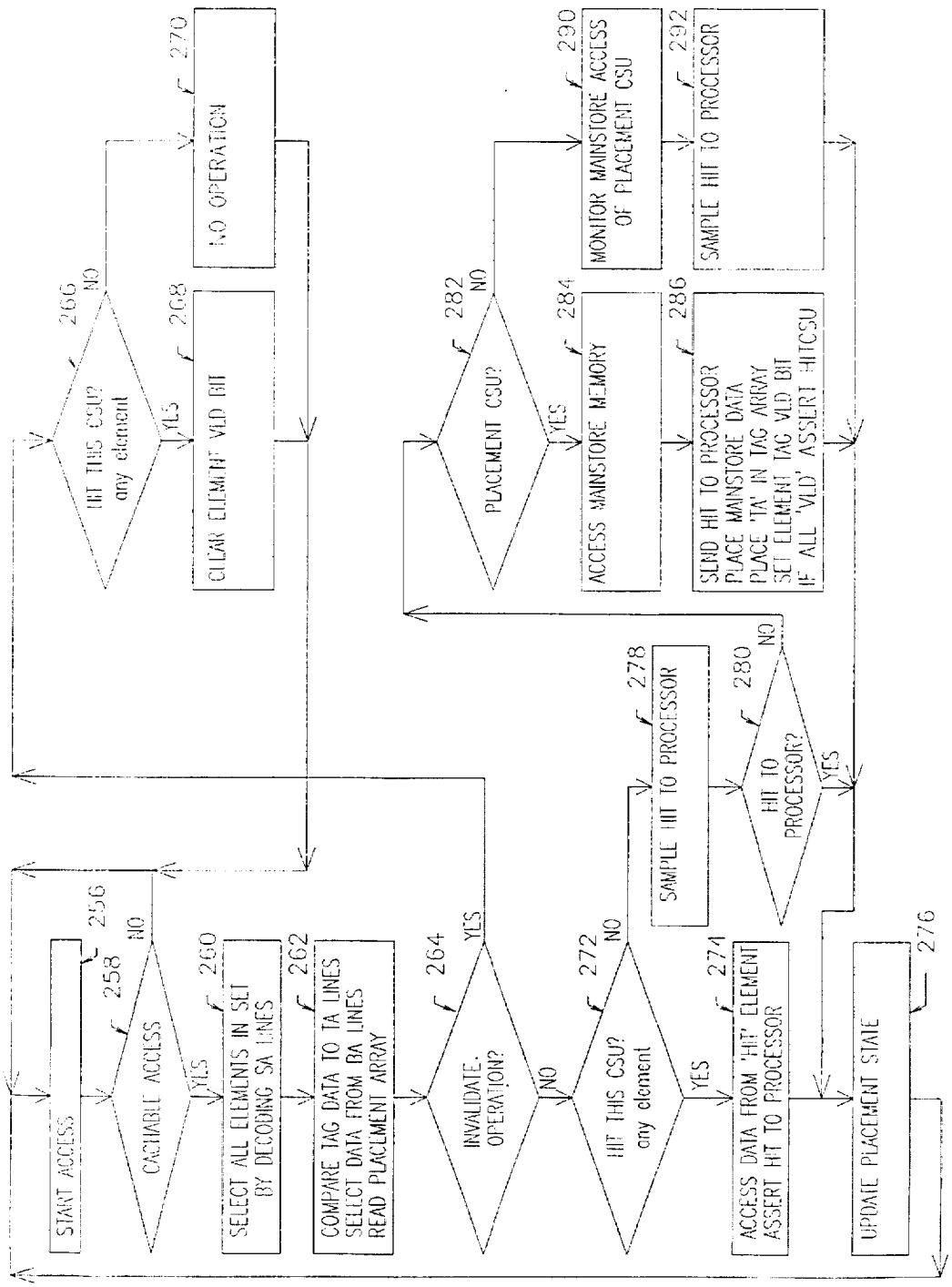
FIG. 14 is a CSU operation flow chart.

FIG. 14 is a block diagram which depicts normal system operation following initialization. Since the CSU contains no valid data following the initialization each CSU begins filling up with data as a result of each new cache block reference. The cache will tend to fill up by first having one element in each SET followed by other elements within each set also filling up. The order of fill is not determined by the cache but by the mainstore blocks referenced by the program.

The initial placement order determines the order in which each SET is filled (become valid).

The process of filling the cache initially may take a long time, but once completed every element in every CSU will have valid data. Once a cache SET is full each MISS causes a placement to occur which replaces a valid block in the cache.

The flow chart in FIG. 14 shows normal CSU operation for each processor access, as the processor accesses the cache, block 256. Each CSU does all these steps in parallel.

Each CSU first evaluates each access to determine whether or not the access is cacheable, block 258. If cacheable, the CSU then presents each element with the PA split into three fields, block 260, and does a TAG compare operation, block 262. The operation is then checked to determine if the access is an invalidation request, block 264. When it is an invalidation request, a check is made to see if the access HIT the TAG of any element, block 266. An invalidation HIT results in the VLD bit of the TAG ARRAY for that element being cleared, block 268. An invalidation MISS results in a return to the idle state through the complete access state, block 270.

When the operation is not an invalidation operation, each CSU checks whether any element in the CSU has a HIT for the operation, block 272. When a HIT has occurred, the DATA ARRAY access proceeds, block 274, and a HIT indication is sent to the processor, usually in some form of a 'READY' indication.

When this CSU has no element with a HIT indication, the HIT indicator to the processor is monitored, block 278, to see if any other CSU had a HIT, block 280.

When no CSU gives a HIT indication the CSU then checks to see if it is the placement CSU, block 282. When it is the placement CSU it does a mainstore access, block 284, to retrieve the cache block containing the requested data location. Then the CSU sends a HIT indication to the processor, while writing the mainstore data in the CSU, setting the TAG VLD bit, block 286. Simultaneously with the assertion of the HIT indication to the processor the CSU simultaneously checks whether the VLD bit of every element is set and if they are all set sends a HITCSU indication to the every other CSU.

When this CSU is not the placement CSU it monitors the placement CSU performing the mainstore access, block 290. It then waits for a HIT indication to the processor, block 292. It should be appreciated that a CSU, or a collection of CSUs comprise what is referred to herein as a status monitor, with the monitoring being a collection of activities in the control logic, placement logic, hit logic and element control logic contained within each CSU.

When a HIT indication has been sent to the processor every CSU updates in parallel its PLACEMENT ARRAY for this SET, block 276. The access is now complete and every CSU returns to waiting for the start of a new access, block 256.

PLACEMENT MECHANISM

The placement mechanism uses a special interconnection between CSU devices. The signaling between devices supports the use of any number of CSUs less than or equal to the maximum number of CSUs. Each device duplicates the same function with the interconnection between devices determining overall system operation.

The interconnection is dependent on the placement algorithm chosen. The key to the operation is that each CSU stores its current placement position for each SET relative to other CSUs in the system. On the basis of the HITCSU information and its current state each CSU makes an independent assessment of whether it is the device doing a cache block placement. Although the assessment is independent it is based on the same HITCSU information and relative PLACEMENT STATE and only one CSU will determine itself to be the placement CSU.

Each CSU may also store information tracking the placement of more than one internal element for each cache SET. The internal placement algorithm is independent of the CSU placement algorithm. The number of internal elements per SET is transparent to the external interface. Due to the transparency of the internal elements within a CSU each CSU on a processor interface may have a different number of internal elements.

Each element for any SET has its own VLD bit. If one or more of these VLD bits are cleared when a HIT occurs in this CSU a HITCSU indication is not signaled to the other CSUs. As a result the CSU PLACEMENT STATE is not changed. This allows a CSU that has had an element invalidated to relinquish its position in the placement algorithm even though another element within the CSU has a HIT. As a result it becomes the placement CSU, on average, much quicker. When the VLD bit of every element is set the occurrence of a HIT on any element results in the CSU signaling a HITCSU indication to the other CSUs on this processor interface. The assertion of the HITCSU lines causes a change in the PLACEMENT STATE making the CSU less likely on average to become the placement CSU for this SET.

When more than one element is present in the CSU placement occurs first in elements having a cleared VLD bit. After the VLD bits are all set the placement occurs according to the chosen internal placement algorithm.

The elements described above contain the minimal function for operation. Many of the additional functions described in the background section could be included on the CSU not explicitly indicated above. However, including additional function beyond that described above does not impact the unique function of this distributed placement mechanism.

A subset of the maximum number of CSU units can be used as a valid system configuration. Each CSU has a driver attached to only one of the HITCSU lines. The ability to subset is achieved by always indicating a HITCSU for each unpopulated CSU. In order to make this subsetability work 1) CSUs are placed in the system in order 1, 2,..., N, and 2) an unpopulated CSU always has a HITCSU indication.

EXAMPLE DISTRIBUTED LRU MECHANISM

A LRU (Least Recently Used) algorithm for cache placement can be implemented by using a straight forward approach. The number of PLACEMENT ARRAY bits for tracking the CSU placement order is one less than 'N' the maximum number of CSUs supported by the implementation. Each bit is dedicated to track the relative state of one other CSUs sharing this processor interface.

This example uses one element per CSU and therefore has no PLACEMENT ARRAY bits for tracking internal element placement order. This example is strictly directed at operation of the distributed CSU placement algorithm.

Each bit uses a simple SET/CLEAR mechanism. Whenever a HITCSU input is asserted the PLACEMENT ARRAY bit associated with that input is cleared during the next PLACEMENT ARRAY update. The PLACEMENT ARRAY bit is SET whenever a CSU is asserting its HITCSU line AND the input for that PLACEMENT ARRAY bit is NOT asserted. This logic is simple and fast and it does not require complex state transitions.

When a CSU has all its PLACEMENT ARRAY bits in the cleared state it is the placement CSU and will place the requested cache block in one of its elements upon determining that a cache MISS has occurred. When the placement has been completed the HITCSU line for this CSU is asserted.

The interconnect of the HITCSU lines is done so each CSU has as inputs a HITCSU line from each of the CSUs attached to this processor interface. HITCSU 1 has a resistive element to cause it to NOT be asserted if it is not driven. HITCSU 2 ... HITCSU N all have resistive elements so that they are asserted if they are not driven. During normal operation each CSU present in the system actively drives its HITCSU output at all times. When a CSU is not present in the system the HITCSU line it would normally drive is asserted by the resistive element making always appear to have a HIT. This results in all PLACEMENT ARRAY bits in all other CSUs having that line as an input being continuously cleared.

Initialization also uses the resistive assertion to initialize each CSU with a fixed value in every location of the PLACEMENT ARRAY. During initialization each CSU looks for the input that is not asserted indicating the HITCSU 1 connection. All CSU PLACEMENT ARRAY bits having input connections less than or equal to the HITCSU 1 input connection are set for every PLACEMENT ARRAY location. All other CSU PLACEMENT ARRAY bits are cleared. The placement order at initialization time corresponds to the order in which CSU devices will be inserted into the system. CSU 1 stores a value of 0, while CSU 2 sets the bit corresponding to CSU 1, on up to CSU 'N' that has all of its bits set. Each CSU has all the bits set which have are connected to a lower numbered CSU.

3 CSU LRU EXAMPLE

Figure 15:
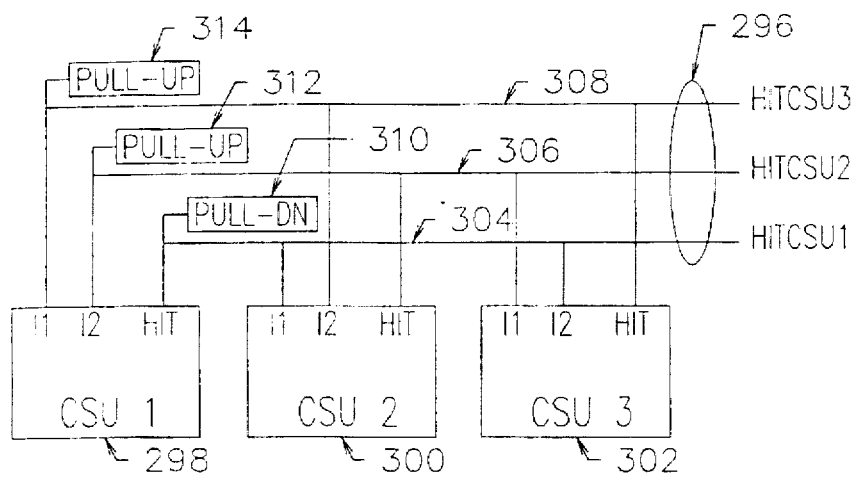
FIG. 15 is a representative block diagram showing the system interconnection of a CSU implemented to support multiple CSUs.

FIG. 15 and Table 6 describe a 3 CSU implementation using the LRU mechanism. FIG. 12 shows the interconnect 296 of the 3 CSUs, CSU 1 298, CSU 2 300 and CSU 3 302, in a manner that meets the LRU interconnection criteria. Table 6 shows the state of the

TABLE 6

| | | CSU | | |
|---|---|---|---|---|
| | | 1 | 2 | 3 |
| | | ARRAY | ARRAY | ARRAY |
| | | BIT | BIT | BIT |
| | | 1 2 | 1 2 | 1 2 |
| PLACEMENT | SET ORDER | HITCSU | HITCSU | HITCSU |
| STATE | MRU LRU | 3 2 | 1 3 | 2 1 |
| 1 | 1 2 3 | 1 1 | 0 1 | 0 0 |
| 2 | 1 3 2 | " | 0 0 | 1 0 |
| 3 | 2 1 3 | 1 0 | 1 1 | 0 0 |
| 4 | 2 3 1 | 0 0 | " | 0 1 |
| 5 | 3 1 2 | 0 1 | 0 0 | 1 1 |
| 6 | 3 2 1 | 0 0 | 1 0 | " |

PLACEMENT ARRAY bits in every CSU for the six possible placement orders from MRU (Most Recently Used) to LRU (Least Recently Used).

The first column of Table 6 shows the six possible PLACEMENT STATEs for a SET across every CSU. The second column shows placement order that would occur for this SET across the CSUs. Any HIT might alter this order by changing the PLACEMENT STATE for this SET. The last three columns show the state of the PLACEMENT ARRAY bits in every CSU and which HITCSU line has a connection to the input for that array bit.

All the HITCSU lines, 304, 306 and 308 for HITCSU lines 1, 2 and 3, respectively, are defined to be active low. A resistive pull-down 310 is used on HITCSU 1 304. Resistive pull-ups 312, 314 are used on HITCSU 2 306 and HITCSU 3 308, respectively.

Initialization places every SET of each PLACEMENT ARRAY of every CSU in PLACEMENT STATE 6 shown in Table 6. HITCSU 1 304 is not asserted. CSU 1 298 having all its inputs asserted clears all CSU placement bits in the PLACEMENT ARRAY. CSU 2 300 having I1 not asserted sets bit 1 and clears bit 2 of the CSU placement bits in the PLACEMENT ARRAY. CSU 3 302 having I2 not asserted sets bit 1 and 2 of the CSU placement bits in the PLACEMENT ARRAY Each cache access that causes a HIT on a CSU element might change the PLACEMENT STATE. While a diagram showing the six PLACEMENT STATEs would be quite complex, the state diagram of an individual CSU is readily shown. With 2 PLACEMENT ARRAY bits the maximum number of possible states for a CSU is 4. FIG. 13 shows these 4 possible states, φφ, block 316, φ1, block 318, 1φ, block 320, and 11, block 322, and the transitions between the states. All 4 states are used for each CSU that can be verified by looking at the contents of Table 6.

State transitions are a function of I1 and I2, the input bits, the occurrence of a VHIT in this CSU (HIT with every element valid) and the current state. This diagram shows all the transitions including those where fewer than the maximum number of 3 CSUs is present on this processor interface.

Each state shows a 2 digit code. The right hand bit is array bit 1 of the CSU placement portion of the PLACEMENT ARRAY bit dependent on the state of I1 while the left hand bit is array bit 2 dependent on state of I2. I1 and I2 are connected to the HITCSU lines as indicated in FIG. 15.

The states are shown in Table 7. These states reflect where this CSU views itself relative to the other CSUs sharing this processor interface. In Table 7 '>' indicates this CSU is more recently used (MRU) than the CSU connected to the indicated input.

TABLE 7

| PLACEMENT ORDER | | |
|---|---|---|
| ARRAY BIT | | PLACEMENT |
| 2 | 1 | ORDER |
| 0 | 0 | PLACEMENT CSU |
| 0 | 1 | CSU > I1, I2 < CSU |
| 1 | 0 | CSU > I2, I1 < CSU |
| 1 | 1 | MRU CSU | and '<' indicates this CSU is LRU than the indicated input.

When only CSU 1 is present in the system only the state of CSU 1 is important. Since I1 and I2 are always asserted so CSU 1 always remains in state '00' shown in Table 7.

When 2 CSUs are used, CSU 1 & CSU 2, HITCSU 3 is always asserted forcing the use of only the last two lines of Table 6. Each CSU switches between these two states depending on whether CSU 1 or CSU 2 had the MRU HIT. Looking at the CSU state diagram in FIG. 16, CSU 1 may make transitions between states 00 and 01, while CSU 2 makes simultaneous transitions between states 10 and 00 respectively.

It should be appreciated that a single CSU system may be designed. Other systems may be designed with more than one CSU incorporated therein when the system is initially constructed. Still other systems may be built wherein an initial number of CSUs are provided and provisions are made to upgrade the system by adding further CSUs at a later date.

4 CSU LRU EXAMPLE

Figure 16:
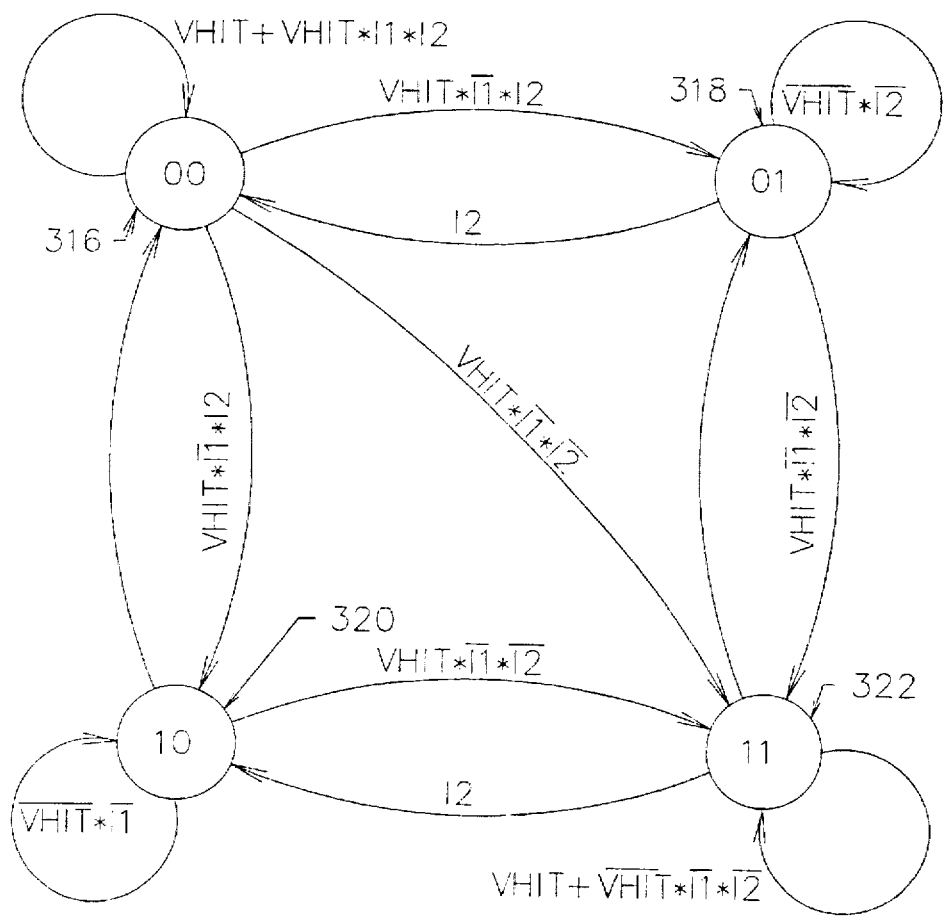
FIG. 16 is a block diagram of a CSU internal state.
Figure 17:
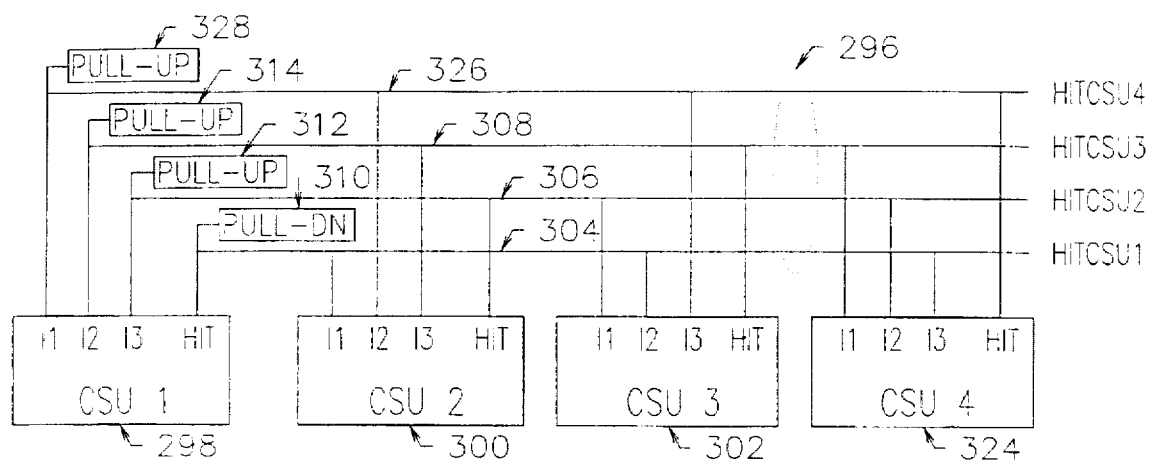
FIG. 17 is a schematic representative block diagram showing the system interconnection of a CSU implemented to support a maximum of 4 CSUs.

For a 4 CSU system the interconnection is shown in FIG. 17, which is similar to that shown in FIG. 16, and uses like reference numbers where appropriate. An additional CSU, CSU 4 324, is shown, as is HITCSU 4 326 and a pull-up resistor 328. The 24 possible orders of the CSUs from the MRu to LRU are shown in Table 8. Note that the same subsetability applies to this example as in previous. Table 9 shows the CSU relative state tracking for this 4 CSU example.

CSU SIZE DISPARITY

Each element of a set has an equal probability, on average, of a HIT occurring. When a disparity exists in the size

TABLE 9

| ARRAY BIT 3 | ARRAY BIT 2 | ARRAY BIT 1 | PLACEMENT ORDER |
|---|---|---|---|
| 0 | 0 | 0 | PLACEMENT CSU |
| 0 | 0 | 1 | CSU > I1, I2 or I3 < CSU |
| 0 | 1 | 0 | CSU > I2, I1 or I3 < CSU |
| 0 | 1 | 1 | CSU > I1 or I2, I3 < CSU |
| 1 | 0 | 0 | CSU > I3, I1 or I2 CSU |
| 1 | 0 | 1 | CSU > I1 or I3, I2 < CSU |
| 1 | 1 | 0 | CSU > I2 or I3, I1 < CSU |
| 1 | 1 | 1 | MRU CSU |

TABLE 8

| SET ORDER MRU LRU | CSU 1 ARRAY BIT 1 2 3 HIT 4 2 3 | CSU 2 ARRAY BIT 1 2 3 HIT 1 3 4 | CSU 3 ARRAY BIT 1 2 3 HIT 2 4 1 | CSU 4 ARRAY BIT 1 2 3 HIT 3 1 2 |
|---|---|---|---|---|
| 1 2 3 4 | 1 1 1 | 0 1 1 | 0 1 0 | 0 0 0 |
| 1 2 4 3 | "      | "     | 0 0 0 | 1 0 0 |
| 1 3 2 4 | "      | 0 0 1 | 1 1 0 | 0 0 0 |
| 1 3 4 2 | "      | 0 0 0 | "     | 0 0 1 |
| 1 4 2 3 | "      | 0 1 0 | 0 0 0 | 1 0 1 |
| 1 4 3 2 | "      | 0 0 0 | 1 0 0 | "     |
| 2 1 3 4 | 1 0 1  | 1 1 1 | 0 1 0 | 0 0 0 |
| 2 1 4 3 | "      | "     | 0 0 0 | 1 0 0 |
| 2 3 1 4 | 1 0 0  | "     | 0 1 1 | 0 0 0 |
| 2 3 4 1 | 0 0 0  | "     | "     | 0 1 0 |
| 2 4 1 3 | 0 0 1  | "     | 0 0 0 | 1 1 0 |
| 2 4 3 1 | 0 0 0  | "     | 0 0 1 | "     |
| 3 1 2 4 | 1 1 0  | 0 0 1 | 1 1 1 | 0 0 0 |
| 3 1 4 2 | "      | 0 0 0 | "     | 0 0 1 |
| 3 2 1 4 | 1 0 0  | 1 0 1 | "     | 0 0 0 |
| 3 2 4 1 | 0 0 0  | "     | "     | 0 1 0 |
| 3 4 1 2 | 0 1 0  | 0 0 0 | "     | 0 1 1 |
| 3 4 2 1 | 0 0 0  | 1 0 0 | "     | "     |
| 4 1 2 3 | 0 1 1  | 0 1 0 | 0 0 0 | 1 1 1 |
| 4 1 3 2 | "      | 0 0 0 | 1 0 0 | "     |
| 4 2 1 3 | 0 0 1  | 1 1 0 | 0 0 0 | "     |
| 4 2 3 1 | 0 0 0  | "     | 0 0 1 | "     |
| 4 3 1 2 | 0 1 0  | 0 0 0 | 1 0 1 | "     |
| 4 3 2 1 | 0 0 0  | 1 0 0 | "     | "     | of the CSUs, due to a disparity in the number of elements, a disparity occurs in the probability of a HIT on the CSUs Consider two CSUs where the first has one element and the second has 4 elements. The first CSU, on average, has a 20% probability of a HIT while the second, on average, has an 80% probability of a HIT. The net result in the system will be placements occur in the first CSU 80% of the time and 20% in the second CSU. Further placements could occur in a manner where data in the first CSU is thrashed while some of the elements in the second CSU are never referenced. This is undesirable because the larger CSU has more elements and should therefore have more frequent placements than the smaller CSU A CSU with 4 elements on average should be the placement CSU 4 times as frequently as a CSU with one element. Yet with a placement algorithm based solely on the CSU HIT rate the CSU with 4 elements is 4 time less likely, on average, to be in the state of placement CSU Many studies on caching have shown that the best element to replace on a given placement cannot be determined. Many algorithms have been studied and simple cases can be constructed, specific to the algorithm, which cause any of them to have a poor HIT ratio. For long traces running actual programs with the OS (Operating System); FIFO (First In First Out) shows, on average, a slightly lower HIT ratio than LRU placement. Since these very different approaches to cache placement result in similar HIT ratios the placement chosen does not require a large amount of elegance The goal of the following is to ensure that the second CSU in the above example contains recently referenced data in all its elements. By having the first CSU require at least one placement before it again becomes the placement CSU it ensures that other CSUs on this processor interface replace stale mainstore blocks.

MODIFIED LRU ALGORITHM

The following modification to the LRU placement algorithm provides a straight forward mechanism for ensuring placement in stale cache blocks. This is done by asserting the HITCSU line at times when this CSU does not have an element with a HIT. The assertion of HITCSU by this CSU alters the PLACEMENT STATE of every CSU sharing this processor interface such that placement in this CSU occurs after placement occurs in one of the other CSUs. This HITCSU assertion occurs in addition to assertions occurring as the result of either a HIT or a placement HITCSU cannot be arbitrarily asserted, rather its assertion must be done in a manner that does not impact the functionality of the overall CSU placement algorithm in use. For the previously described LRU placement algorithm the CSU can assert its HITCSU indication from the time this CSU does a placement until another CSU does a placement. The result is one other CSU in the system is forced to do a placement before this CSU does another placement. Put another way this function suspends this CSU from the LRU placement algorithm for one placement cycle. Every other CSU in the system treats this CSU as if it is not present during this placement cycle.

A bit must be added to each SET of the PLACEMENT ARRAY to track when this CSU is in this special placement state. This bit is set when this CSU does a placement and is reset when any other CSU does a placement.

When this CSU is the only CSU in the system, however it remains the placement CSU as all other HITCSU lines would simultaneously be asserted.

When this algorithm modification is used by more than one CSU on this processor interface it can only be set in the placement array of one CSU for each SET at a particular instance in time. The largest impact occurs if only 2 CSUs are present causing the placement algorithm to change from a LRU placement to a FIFO placement.

PROCESSOR & CSU DEVICE

A CSU with distributed placement may be integrated on a processor chip. This gives the processor a basic cache to enhance its performance, but allows the performance to be further enhanced by expanding the size of the cache supporting this processor.

Figure 18:
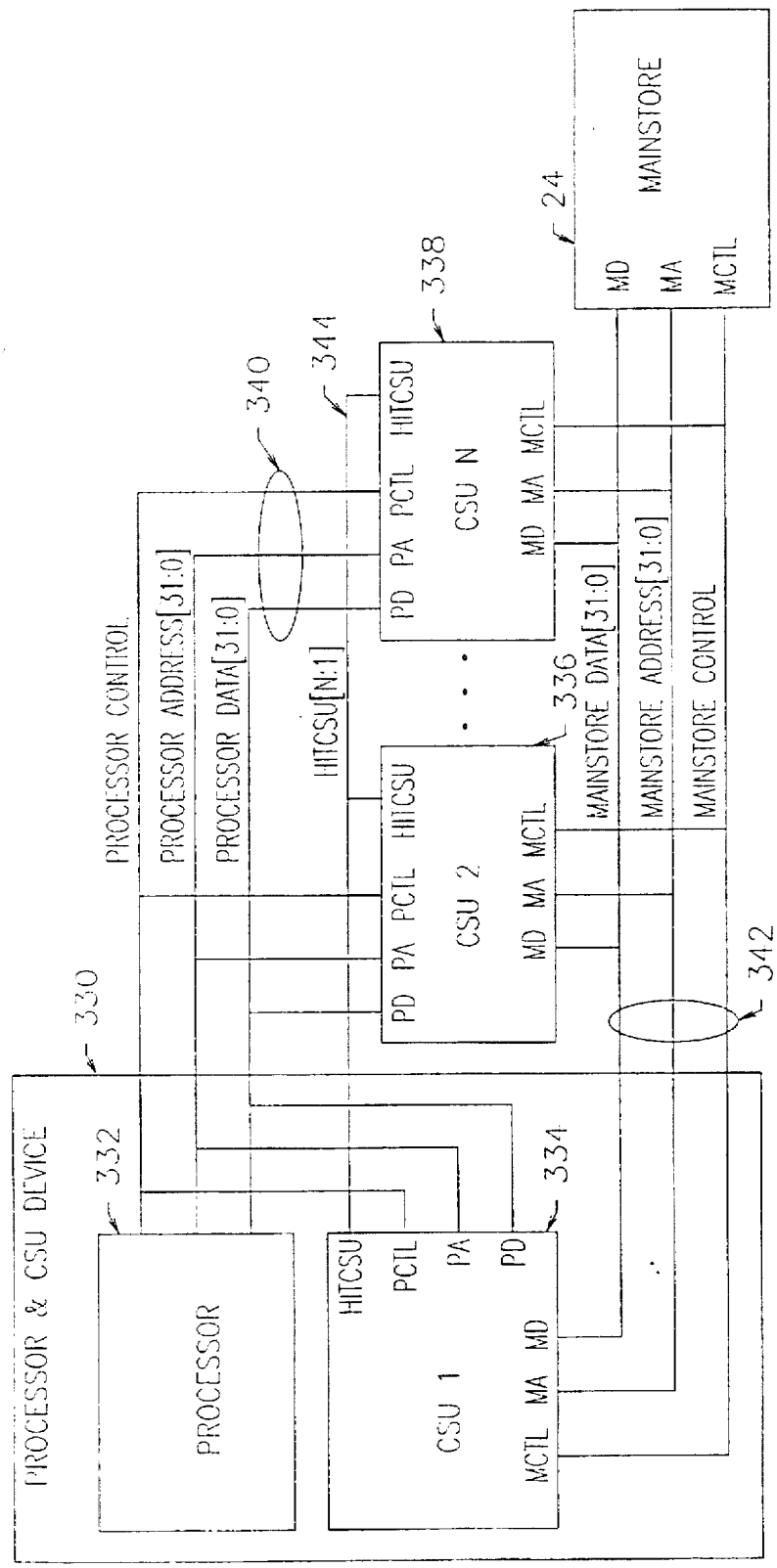
FIG. 18 is a block diagram depicting a processor having an integrated CSU.

Such a configuration is depicted in FIG. 18. A single processor device 330 includes a processor 332 and a CSU 1 334. A cache includes CSU 2 336 through CSU N 338. A processor interface 340 extends between device 330 and the cache, and a mainstore interface 342 extends between the cache and mainstore 24. HITCSU line 244 is connected between CSU 1 334 and the CSUs in the cache.

The Processor CSU sets the size of the element used in the overall cache for the system. For instance, if the processor has a 4 way SET ASSOCIATIVE MEMORY 16 Kbytes in size that means each element is 4 Kbytes. Each element in every additional CSU must also be 4 Kbytes in size.

The external CSU would normally have the ability to place at least 4 times the amount of storage as the on processor CSU. This would mean in the example above that the external CSU would be a 16 way SET ASSOCIATIVE MEMORY 64 Kbytes in size This configuration needs to invoke the use of the size disparity placement algorithm.

Although a preferred embodiment of the architecture has been disclosed, along with modifications thereto, it should be appreciated that further variations and modifications may be made to the architecture without departing from the scope of the invention, as defined in the appended claims.

What I claim is:

1. A distributed placement architecture associated with a single processor interface for distributing and retrieving information comprising:

a variable-size, singular cache having plural cache storage units (CSUs) therein, wherein each CSU includes a set associative memory having at least one memory element for storing information, wherein the number of elements within each set of the set associative memory is variable, thereby providing said variable size cache, and which further includes a distribution controller, said distribution controller being configured to collectively distribute within and receive information from the cache by selecting an individual CSU for placement and/or retrieval of information and for controlling placement of data among the plural CSUs and within individual CSUs, wherein said distribution controller includes a placement mechanism which distributes data within said set associative memory to individual memory elements depending on the placement of said memory element within said set associative memory, wherein the number of CSUs is variable, and wherein said CSU is insertable into said variable-size cache without re-configuring the connectivity or settings of said variable-size cache;

a communications network between said plural CSUs operatively connecting each CSU directly to each of the other CSUs, said communications network providing a CSU-associated indication signal to all cache storage units within the singular cache, wherein such signal indicates a cache hit in one of said plural CSUs and identifies that one;

wherein said distribution controller is operatively connected to said communications network for sensing and selecting a CSU in which to place information.

2. The architecture of claim 1 wherein each CSU includes: a set associative memory having at least one element block, an address director, a placement logic, a placement array, a data director and a control logic.

3. The architecture of claim 2 further comprising a distribution controller, operatively connected to said communications network, for selecting individual CSUs in which to place information.

4. The architecture of claim 3 wherein said distribution controller includes a placement mechanism for controlling the distributions of information within the cache to individual CSUs according to a CSU placement algorithm and depending on the placement of said individual CSU within the architecture.

5. The architecture of claim 3 wherein said distribution controller includes a placement mechanism which controls the distribution of information within said set associative memory to individual element blocks according to an internal placement algorithm and depending on the placement of said element block within the set associative memory.

6. The architecture of claim 5 wherein said placement mechanism includes a CSU status monitor for monitoring the placement state of an individual CSU relative to the placement state of other CSUs in the architecture.

7. The architecture of claim 6 wherein said placement mechanism is constructed and arranged to place information within an individual CSU when said individual CSU determines that it is a placement CSU.

8. The architecture of claim 1 which includes a secondary TAG in each CSU.

9. A distributed cache placement architecture associated with a single processor interface for distributing and retrieving information comprising:

a variable-size, singular cache having plural cache storage units (CSUs) therein, wherein each CSU includes a set associative memory having at least one element block, wherein said set associative memory is constructed and arranged to allow insertion and removal of element blocks to vary the size of said variable-size cache without reconfiguration of said variable-size cache, an address director, a placement logic, a placement array, a data director and a control logic;

a communications network between said plural CSUs said communications network providing a CSU-associated indication signal to all CSUs within the singular cache, wherein such signal indicates a cache hit in one of said plural CSUs and identifies that one and said communications network includes a HIT line connecting all CSUs in the architecture;

a distribution controller operatively connected to said communications network, for sensing and selecting an individual CSU in which to place data, wherein said distribution controller includes a placement mechanism which distributes data within said set associative memory to individual memory elements depending on the placement of said memory element within said set associative memory; and a CSU status monitor for monitoring the placement state of an individual CSU relative to the placement state of other CSUs in the architecture.

10. The architecture of claim 9 wherein said set associative memory includes a primary TAG therein and wherein said plural CSUs each includes a secondary TAG.

11. The architecture of claim 9 wherein said distribution controller includes a placement mechanism for controlling the distributions of information within the cache to individual CSUs according to a CSU placement algorithm and depending on the placement of said individual CSU within the architecture.

12. The architecture of claim 9 wherein said distribution controller includes a placement mechanism which controls the distribution of information within said set associative memory to individual element blocks according to an internal placement algorithm and depending on the placement of said element block within the set associative memory.

13. The architecture of claim 9 wherein said placement mechanism includes a CSU status monitor for monitoring the placement state of an individual CSU relative to the placement state of other CSUs in the architecture.

14. The architecture of claim 13 wherein said placement mechanism is constructed and arranged to place information within an individual CSU when said individual CSU determines that it is a placement CSU.

15. A distributed cache architecture associated with a single processor interface for distributing and retrieving information in/from a cache comprising:

a variable-size cache having plural cache storage units (CSUs) therein, wherein each CSU includes a set associative memory having at least one memory element for storing information, and which further includes a distribution controller, said controllers being configured to collectively distribute within and receive information from the cache by selecting individual CSUs for placement and/or retrieval of information, wherein the number of CSUs is variable, thereby providing said variable size cache, and wherein said CSU is insertable into said variable-size cache without re-configuring the connectivity or settings of said variable-size cache;

a communications network between said plural CSUs operatively connecting each CSU directly to each of the other CSUs, whereby all memory elements in said plural CSUs are interconnected so as to collectively define the singular cache, said communications network providing a CSU-associated indication signal to all CSUs, wherein such a signal indicates a cache hit in one of said plural CSUs and identifies that one, wherein the controllers of said plural CSUs are operatively interconnected via said communications network;

wherein each CSU includes a distribution controller, and the controllers of said plural CSUs are operatively interconnected via said communications network, and are configured to collectively distribute within and receive information from the cache by sensing and selecting individual CSUs for placement and/or retrieval of information, wherein said distribution controller includes a placement mechanism which senses the presence of CSUs and which distributes data within said set associative memory to individual memory elements depending on the placement of said memory element within said set associative memory.

16. The architecture of claim 15, wherein each CSU further includes a distribution controller, and the controllers of said plural CSUs are operatively interconnected via said communications network, said controllers are configured to collectively distribute within and receive information from the cache by selecting individual CSUs for placement and/or retrieval of data.

17. The architecture of claim 15, wherein at any instant in time, not more than one distribution controller effectively controls placement and retrieval of data within/from the cache.

* * * * *